US011415754B2

(12) United States Patent
Butler et al.

(10) Patent No.: US 11,415,754 B2
(45) Date of Patent: Aug. 16, 2022

(54) FIBER ARRAY SPACERS, OPTICAL ASSEMBLIES INCORPORATING FIBER ARRAY SPACERS, AND METHODS OF FABRICATING THE SAME

(71) Applicant: CORNING INCORPORATED, Corning, NY (US)

(72) Inventors: Douglas Llewellyn Butler, Painted Post, NY (US); James Scott Sutherland, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 87 days.

(21) Appl. No.: 17/022,443

(22) Filed: Sep. 16, 2020

(65) Prior Publication Data

US 2021/0096302 A1 Apr. 1, 2021

Related U.S. Application Data

(60) Provisional application No. 62/908,187, filed on Sep. 30, 2019.

(51) Int. Cl.
*G02B 6/36* (2006.01)
*G02B 6/25* (2006.01)

(52) U.S. Cl.
CPC ............. *G02B 6/3676* (2013.01); *G02B 6/25* (2013.01); *G02B 6/3648* (2013.01)

(58) Field of Classification Search
CPC ...... G02B 6/3676; G02B 6/25; G02B 6/3648; G02B 6/3861; G02B 6/3885; G02B 6/3628

See application file for complete search history.

(56) References Cited

U.S. PATENT DOCUMENTS

| | | | | |
|---|---|---|---|---|
| 4,252,407 A | * | 2/1981 | Bubanko | G02B 6/3842 385/59 |
| 4,733,068 A | * | 3/1988 | Thiele | G06F 3/0421 250/227.14 |
| 6,618,514 B1 | * | 9/2003 | Cole | G02B 6/30 385/52 |

(Continued)

FOREIGN PATENT DOCUMENTS

WO 2019/089220 A1 5/2019

OTHER PUBLICATIONS

Extended European Search Report and Search Opinion; 20199086.8; dated Nov. 17, 2020; 9 Pages; European Patent Office.

*Primary Examiner* — Ellen E Kim
(74) *Attorney, Agent, or Firm* — Grant A. Gildehaus

(57) ABSTRACT

Fiber array spacers, optical fiber assemblies, optical assemblies, and methods for fabricating optical assemblies are disclosed. In one embodiment, an optical fiber assembly includes a fiber array spacer and a fiber ribbon having an array of optical fibers. The fiber array spacer has an array of spacer fibers, wherein individual spacer fibers of the array of spacer fibers are bonded to one another, and a diameter of the individual spacer fibers determines a height of the fiber array spacer. Each optical fiber of the array of optical fibers has an glass portion. The glass portion of each optical fiber is bonded to the fiber array spacer such that a longitudinal axis of the individual spacer fibers is transverse to a longitudinal axis of individual optical fibers of the fiber ribbon.

44 Claims, 16 Drawing Sheets

(56) References Cited

U.S. PATENT DOCUMENTS

| | | | | |
|---|---|---|---|---|
| 10,345,535 B2* | 7/2019 | Butler | ............... | G02B 6/423 |
| 2014/0185993 A1* | 7/2014 | Hung | ............... | G02B 6/3897 |
| | | | | 250/216 |
| 2014/0321809 A1* | 10/2014 | Bowen | ............... | G02B 6/3839 |
| | | | | 385/65 |
| 2015/0205058 A1* | 7/2015 | Kuo | ............... | G01J 1/0411 |
| | | | | 250/227.24 |
| 2017/0205592 A1* | 7/2017 | Pfnuer | ............... | G02B 6/423 |
| 2019/0170945 A1* | 6/2019 | Fortusini | ............... | G02B 6/305 |

* cited by examiner

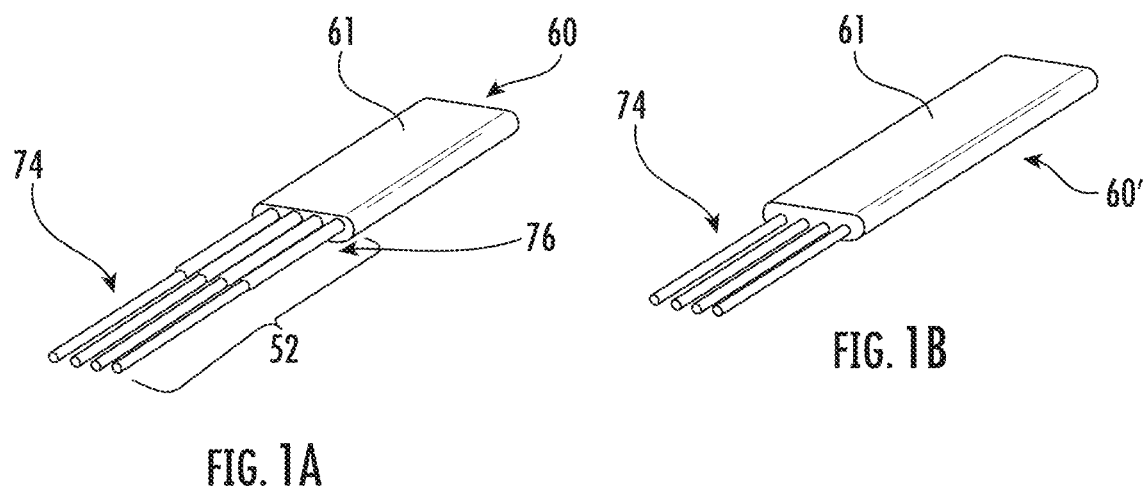
FIG. 1A
FIG. 1B
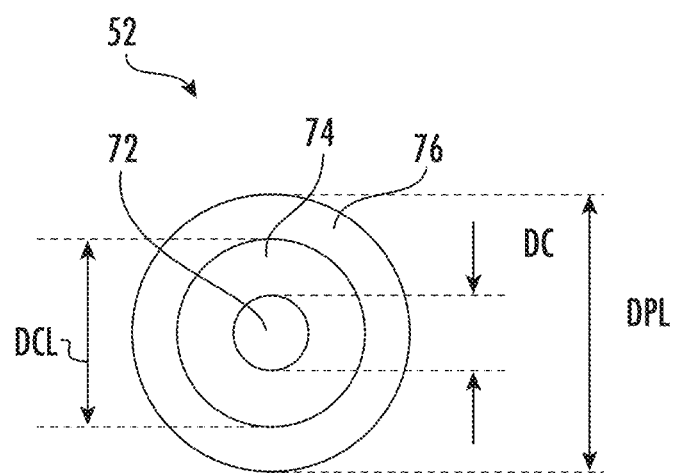
FIG. 1C

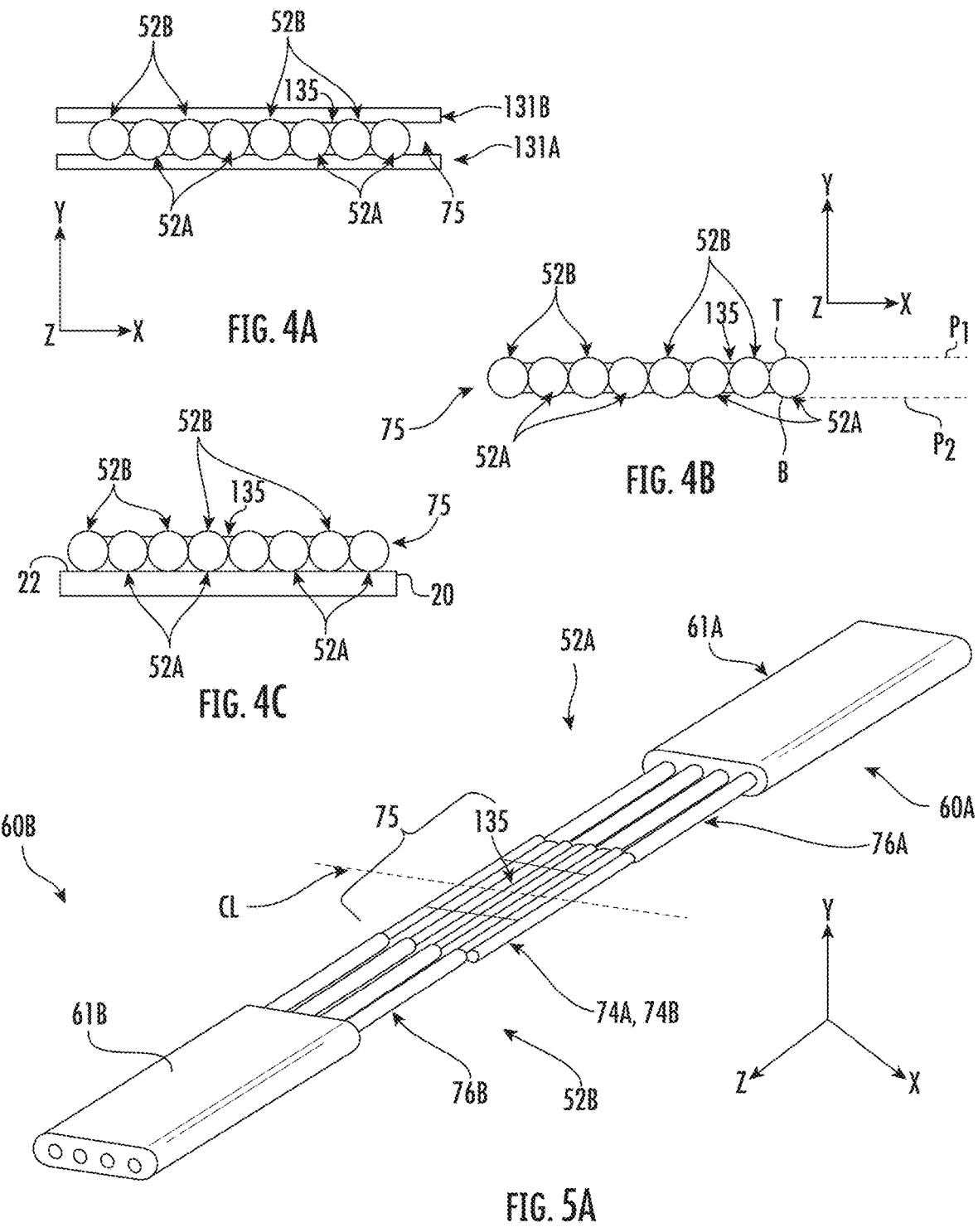

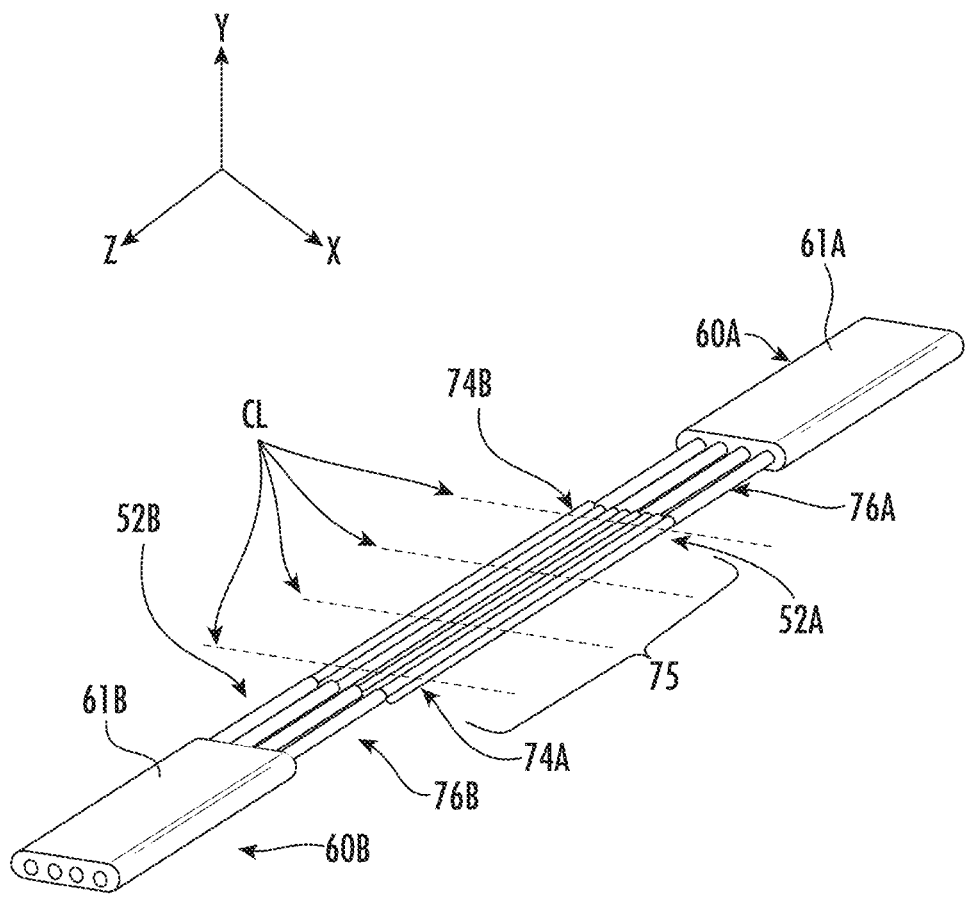
FIG. 6A
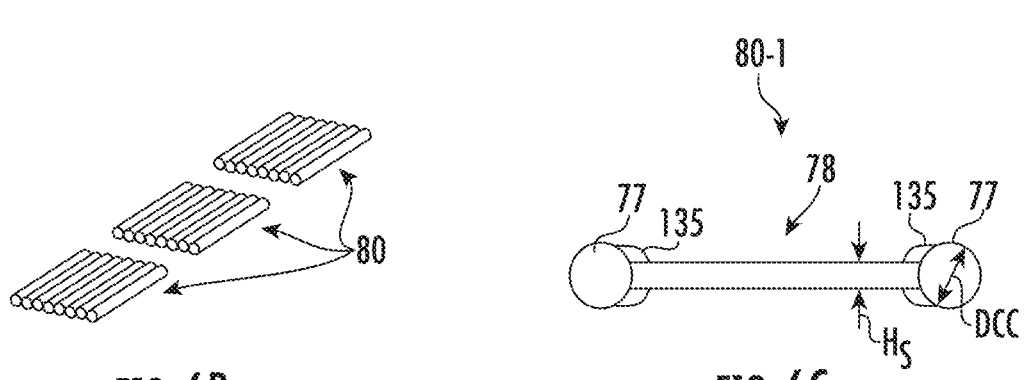
FIG. 6B
FIG. 6C

FIBER ARRAY SPACERS, OPTICAL ASSEMBLIES INCORPORATING FIBER ARRAY SPACERS, AND METHODS OF FABRICATING THE SAME

PRIORITY APPLICATION

This application claims the benefit of priority of U.S. Provisional Application No. 62/908,187, filed on Sep. 30, 2019, the content of which is relied upon and incorporated herein by reference in its entirety.

BACKGROUND

The present disclosure generally relates to optical assemblies and, more particularly, to optical assemblies incorporating fiber array spacers having a precise height provided by precision-diameter optical fiber.

Benefits of optical fiber include extremely wide bandwidth and low noise operation. Because of these advantages, optical fiber is increasingly being used for a variety of applications, including, but not limited to, broadband voice, video, and data transmission. Outdoor fiber networks are popular to support the demand of data consumption. Due to high speed wireless communication networks and the Internet of Things, many communication devices and antennas need to be equipped with a fiber optic connection for communicating data into the optical fiber infrastructure required of such communication networks.

Low-cost fiber array assemblies are important components for connectors and photonic integrated circuit interconnections. For example, two-dimensional fiber arrays on a precise pitch may be required for low-loss coupling to arrays of lenses on a separate substrate. Two-dimensional fiber array interconnections can also be used in high density interconnections to photonic chip grating couplers. Such fiber arrays require not only a precise lateral pitch between adjacent optical fibers, but also a precise vertical pitch between optical fibers of adjacent rows of optical fibers. Precise height placement of optical components may be required in other optical applications as well.

However, substrates of a precise thickness to provide such precise height tolerances are costly and difficult to fabricate. For example, it may be difficult to precisely draw a glass sheet having a desired thickness. Additionally, it may be time consuming and costly to machine or etch a substrate to a desired thickness.

SUMMARY

Optical communication applications where one or more optical signals are passed between two optically coupled devices may require vertical and horizontal alignment between the optically coupled devices. As a non-limiting example, first and second optically coupled devices may include one or more waveguides or cores of an optical fiber. The waveguides or cores may be disposed on a reference surface such that they are space above or below the reference surface as a precision vertical offset distance. In some applications, the vertical offset is set to an easily met target, such as the equivalent to the radius of an optical fiber (e.g., 62.5 μm). In other applications, such as where the vertical offset distance is greater than the radius of an optical fiber, vertical spacers may be employed.

In embodiments of the present disclosure, high-geometrical accuracy fiber array spacers are fabricated and utilized to provide precision vertical offset distances in optical communication applications. Embodiments take advantage of the high geometrical accuracy inherent in modern optical fibers to fabricate precision spacers. Such fiber array spacers may be employed in any optical communication applications, such as optical coupling between two optical cable assemblies, between an optical cable assembly and a photonic chip, between two photonic chips, and any other application wherein optical signals pass between one optical device and another.

In this regard, in one embodiment, an optical fiber assembly includes a fiber array spacer and a fiber ribbon having an array of optical fibers. The fiber array spacer has an array of spacer fibers, wherein individual spacer fibers of the array of spacer fibers are bonded to one. Each optical fiber of the array of optical fibers has an glass portion. The glass portion of each optical fiber is bonded to the fiber array spacer such that a longitudinal axis of the individual spacer fibers is transverse to a longitudinal axis of individual optical fibers of the array of optical fibers.

In another embodiment, an optical assembly includes a fiber array spacer and a photonic integrated circuit bonded to the fiber array spacer. The fiber array spacer includes an array of spacer fibers, wherein individual spacer fibers of the array of spacer fibers are bonded to one another.

In another embodiment, a fiber array spacer includes an array of spacer fibers, each individual spacer fiber including a first surface defining a first plane and a second surface defining a second plane parallel to the first plane. The fiber array spacer further includes an adhesive disposed between adjacent spacer fibers that bonds the individual spacer fibers to one another, wherein the adhesive does not extend beyond the first plane and the second plane.

In another embodiment, a method of fabricating an optical fiber assembly includes disposing an optical component onto a fiber array spacer that includes an array of spacer fibers. Individual spacer fibers of the array of spacer fibers are bonded to one another. The method further includes bonding the optical component to the fiber array spacer.

BRIEF DESCRIPTION OF THE DRAWINGS

FIG. 1A illustrates a perspective view of an example multi-fiber cable having a portion of a cable jacket stripped away, and optical fibers having an glass portion wherein some protective coating remains according to one or more embodiments described and illustrated herein;

FIG. 1B illustrates a perspective view of another example multi-fiber cable having a portion of a cable jacket stripped, and optical fibers having an glass portion with all protective coating removed from the optical fibers after the cable jacket according to one or more embodiments described and illustrated herein;

FIG. 1C illustrates an end view of an example optical fiber according to one or more embodiments described and illustrated herein;

FIG. 4A illustrates an end view of an interdigitated array of optical fibers and two release sheets according to one or more embodiments described and illustrated herein;

FIG. 4B illustrates an end view of an example interdigitated array of optical fibers with release sheets removed according to one or more embodiments described and illustrated herein;

FIG. 4C illustrates an end view of an example interdigitated array of optical fibers bonded to a support plate according to one or more embodiments described and illustrated herein;

FIG. 5A illustrates an example first multi-fiber cable and an example second multi-fiber cable that are joined at interdigitated glass portions according to one or more embodiments described and illustrated herein;

FIG. 6A illustrates a perspective view of a first multi-fiber cable and a second multi-fiber cable that are joined at interdigitated glass portions to be cut along multiple cut lines according to one or more embodiments described and illustrated herein;

FIG. 6B illustrates a perspective view of example fiber array spacers cut from the interdigitated glass portions depicted by FIG. 6A according to one or more embodiments described and illustrated herein;

FIG. 6C illustrates an end view of an example fiber array spacer comprising an intermediary spacer sheet according to one or more embodiments described and illustrated herein;

DETAILED DESCRIPTION

Figure 2A:
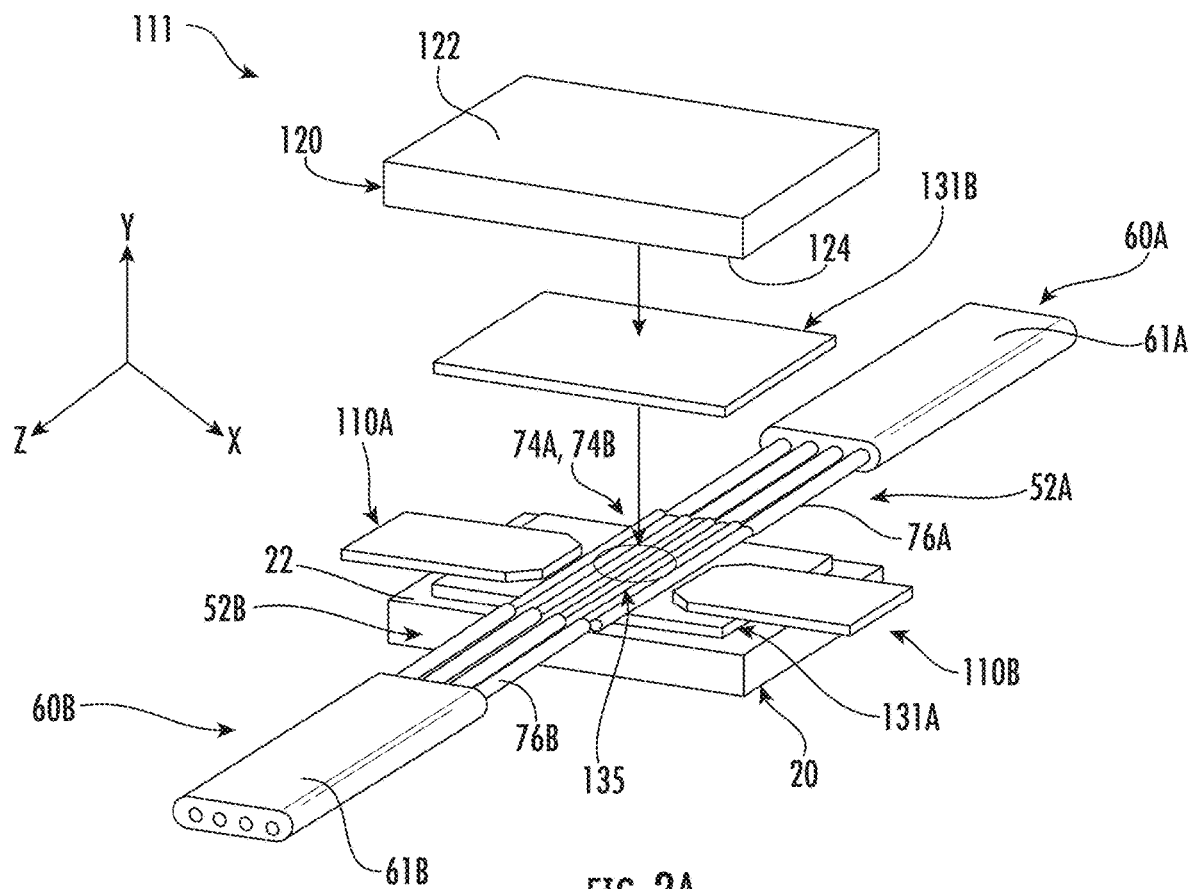
FIG. 2A illustrates a partially exploded, perspective view of an example assembly bench for fabricating a fiber array spacer and/or an optical fiber assembly according to one or more embodiments described and illustrated herein.

Embodiments described herein are directed to fiber array spacers that provide a precision-thickness spacer for optical components, as well as optical assemblies that incorporate fiber array spacers and methods of fabricating the same. The fiber array spacers described herein are fabricated from optical fibers and leverage the precise diameter of exposed glass optical fibers to enable fiber array spacers of a highly precise thickness. The precision of the thickness of the fiber array spacer is based on the tolerance of the diameter of the spacer fibers that make up the fiber array spacer. It is much easier to fabricate drawn glass optical fibers having a precise diameter than it is to fabricate a sheet having a uniformly precise thickness. Thus, embodiments described herein enable low-cost fabrication of two-dimensional fiber arrays as well as other optical components where precision along the Y-axis (i.e., vertical direction) may be required.

Various embodiments of fiber array spacers comprising spacer fibers, optical fiber assemblies optical components, and methods of manufacture are described in detail herein.

Referring now to FIG. 1A, an example multi-fiber cable 60 (i.e., a fiber ribbon) for fabricating a fiber array spacer for an optical fiber assembly is illustrated. The multi-fiber cable 60 comprises an array of optical fibers 52 that are supported by a cable jacket 61. The front end of the cable jacket 61 is stripped away, thereby exposing the array of optical fibers 52. As a non-limiting example, the stripping process for removing the cable jacket 61 may be carried out using mechanical strippers, which heat and soften the cable jacket 61 prior to removal using a pair of serrated blades.

A protective coating 76 is stripped away at the front end of the array of optical fibers 52 to expose an glass portion 74. However, it should be understood that embodiments are not limited to optical fibers 52 having an exposed cladding. For example, the glass portion 74 may be a core portion. The protective coating 76 may be removed using a similar mechanical process referred to above with respect to the cable jacket 61, or it may be removed by a laser-based stripping process. Although FIG. 1A illustrates a portion of the protective coating 76 present on the exposed array of optical fibers, embodiments are not limited thereto. For example, FIG. 1B illustrates a multi-fiber cable 60 wherein substantially all of the protective coating 76 is removed from the exposed array of optical fibers 52.

Referring to FIG. 1C, each optical fiber 52 comprises a core 72, a cladding 74 surrounding the core, and a protective coating 76 surrounding the cladding. As stated above, the protective coating is stripped way to provide an glass portion 74. The core 72 has a core diameter DC, the cladding has a cladding layer diameter DCL, and the protective coating has a protective coating layer DPL. Because the diameter of optical fibers is precisely controlled, the glass portion (i.e., the cladding) has a precise diameter DCL that is utilized form a fiber array spacer with a precise height to precisely align optical fibers of an optical connector or an optical assembly. An example optical fiber for the optical fiber 52 is Corning SMF-28® fiber manufactured and sold by Corning, Inc. or Corning, N.Y., which has a diameter of 125 µm. However, embodiments are not limited thereto. As another example, the optical fiber may have a cladding layer diameter DCL (or a core diameter DC) of 250 µm. Optical fibers may be selected based on their diameter, and also may be custom manufactured to have a desired diameter within a specified tolerance.

Referring now to FIG. 2A, an example assembly bench 111 used to fabricate an optical fiber array spacer is illustrated. As described in more detail below, the assembly bench 111 is used to interdigitate optical fibers of two multi-fiber cables 60. The term "interdigitate" or "interdigitated" as used herein means that the first and second optical fibers of two multi-fiber cables 60 (e.g., A and B) are arranged in an alternating pattern A-B-A-B-A-B and so on.

The illustrated assembly bench 111 includes a support plate 20 (i.e., a first support substrate), a first release sheet 131A, a first pusher element 110A, a second pusher element 110B, a second release sheet 131B, and a cover plate 120 (i.e., a second support substrate).

Figure 2B:
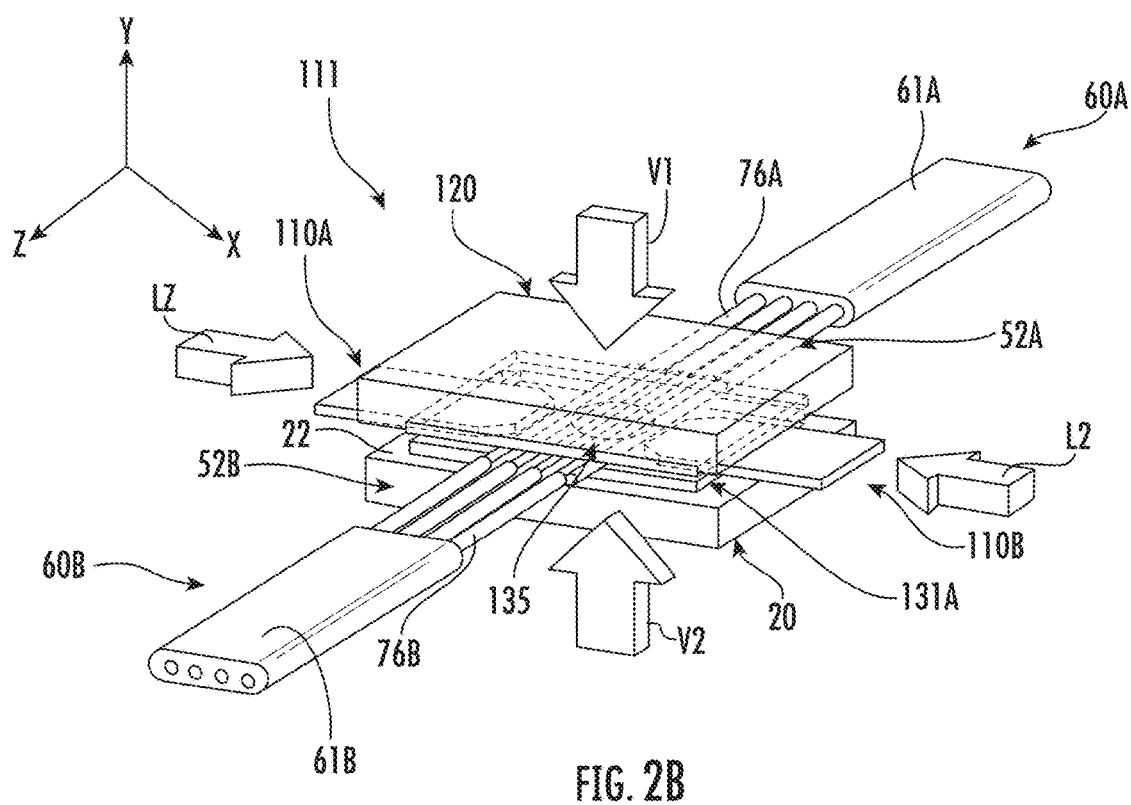
FIG. 2B illustrates a perspective view of the assembly bench showing direction of applied forces depicted by FIG. 2A according to one or more embodiments described and illustrated herein.

The support plate 20 supports all of the elements of the assembly bench 111 and serves as a bearing surface for applied vertical squeeze forces V1 and V2 (FIG. 2B). The support plate 20 has a precision flat surface 22 such that any deviation from an ideal plane fitted to the precision flat surface 22 is less than or equal to 0.1 µm. The surface flatness of the precision flat surface 22 should be precisely controlled to ensure uniform height of the resulting fiber array spacer. The support plate 20 may be fabricated from any suitable material. As a non-limiting example, the support plate 20 may be a fusion drawn glass substrate having a uniform thickness.

The first release sheet 131A is disposed on the precision flat surface 22 of the support plate 20. The first release sheet 131A (and the second release sheet 131B) may be implemented as a thin polymer sheet of uniform thickness (e.g., a sheet of polytetrafluoroethylene (PTFE), polyvinylidene chloride (PVDC), and low-density polyethylene (LDPE)), or it may be thin surface coating (e.g., PTFE or oil coating) of controlled uniform thickness applied to the precision flat surface 22 prior to adhesive application. The first release sheet 131A should be thin enough to enable sufficient ultra-violet (UV) radiation transmission to enable adhesive curing, as described in more detail below. Additionally, the first release sheets described herein should be thin enough (e.g., less than or equal to 10 µm or less than or equal to 5 µm) such that deformation of the release sheet(s) during fabrication does not contribute to error in the vertical alignment of the spacer fibers, as described in more detail below. Further, the release sheets described herein should be precisely thick such that the release sheet(s) do not contribute to error in the vertical alignment of the spacer fibers. As a non-limiting example.

In a specific, non-limiting example, the first release sheet 131A and/or the second release sheet 131B may be configured as a fluorosilane coating that is applied to at least the precision flat surface 22, such as by a dipping process. The fluorosilane coating results in a durable monolayer that does not bond to UV cured adhesives. Because fluorosilane release coating may be applied to any material with surface oxides, such as metals or certain ceramics, they are also useful for coating other fixture elements, such as the first and second pusher elements 110A, 110B described below.

A first multi-fiber cable 60A and a second multi-fiber cable 60B are used to fabricate the fiber array spacer. The first multi-fiber cable 60A includes a first cable jacket 61A having been stripped to expose an array of first optical fibers 52A, which have a first protective coating portion 76A and a first glass portion 74A (which may be exposed cladding or core). It should be understood that embodiments may not use a multi-fiber cable but rather bare optical fibers that have neither a protective coating nor a cable jacket.

Similarly, the second multi-fiber cable 60B includes a second cable jacket 61B having been stripped to expose an array of second optical fibers 52B, which have a second protective coating portion 76B and a second glass portion 74B (which may be exposed cladding or core). The second multi-fiber cable 60B provides an additional array of optical fibers.

The first and second glass portions 74A, 74B may be exposed cladding or core. However, in some embodiments, the first and second glass portions 74A, 74B may be coated with a coating to increase durability, or to improve laser bonding as described in more detail below. A non-limiting example is a titanium coating. The coating should be thin enough and its thickness controlled so that the coating does not adversely affect the precise diameter of the drawn fibers that enable the precision spacing of the fiber spacer array.

The glass portions 74A, 74B of the first and second optical fibers 52A, 52B are arranged in opposition and interdigitated on the first release sheet 131A. Thus, the interdigitated array of optical fibers comprises alternating first optical fibers 52A and second optical fibers 52B.

The cover plate 120 includes a precision flat surface 122 such that any deviation from an ideal plane fitted to the precision flat surface 22 is less than or equal to 0.1 µm. A non-limiting example material is fusion drawn glass. As described in more detail below, the cover plate 120 applies a vertical downward force on the interdigitated glass portions 74A, 74B of the first and second optical fibers 52A, 52B.

An adhesive 135, such as a UV-curable adhesive, is disposed on the interdigitated glass portions 74A, 74B of the first and second optical fibers 52A, 52B. A second release sheet 131B is disposed on the glass portions 74A, 74B of the first and second optical fibers 52A, 52B and the adhesive 135. The second release sheet 131B may be a polymer sheet or a coating (e.g., a fluorosilane coating) that is applied to the precision flat surface 122 of the cover plate 120 as described above with respect to the first release sheet 131A. Thus, the first release sheet 131A and the second release sheet 131B are positioned between the interdigitated glass portions 74A, 74B and the support plate 20 and the cover plate 120, respectively, to prevent the interdigitated glass portions 74A, 74B from becoming permanently bonded to the support plate 20 and the cover plate 120.

The first and second pusher elements 110A, 110B apply horizontal forces that squeeze the interdigitated glass portions 74A, 74B together from opposite sides. The first and second pusher elements 110A, 110B should have a thickness that is less than a diameter of the glass portions 74A, 74B of the first and second optical fibers 52A, 52B to enable them to slide between the support plate 20 and the cover plate 120. Examples of the first and second pusher elements 110A, 110B include, but are not limited to, solid sheets of glass, metal, plastic, or ceramic. In another non-limiting example, the first and second pusher elements 110A, 110B may be an array of optical fibers having a diameter less than the diameter of the interdigitated glass portions 74A, 74B. As stated above, the first and second pusher elements 110A, 110B may be coated with a fluorosilane release coating, which may be beneficial over PTFE-coated elements because PTFE-coated pusher elements can experience delamination during pusher element removal after adhesive curing, which results in damage to the pusher elements and residual PTFE material remaining along the sides of the fiber array where it can inhibit precision passive alignment to other components.

Referring to FIG. 2B, the interdigitated glass portions 74A, 74B are squeezed by the first pusher element 110A applying a first lateral force L1 and the second pusher element 110B applying a second, opposing lateral force L2. The first and second lateral forces L1, L2 drive the interdigitated glass portions 74A, 74B into contact with one another such that there is substantially no gap (less than 0.1 μm as a non-limiting example) between adjacent glass portions of the first and second optical fibers 52A, 52B. A first vertical force V1 is applied by way of the cover plate 120 and a second vertical force V2 is applied by way of the support plate 20. The first and second vertical forces V1, V2 establish the location of the interdigitated glass portions 74A, 74B in the Y-direction.

Figure 3A:
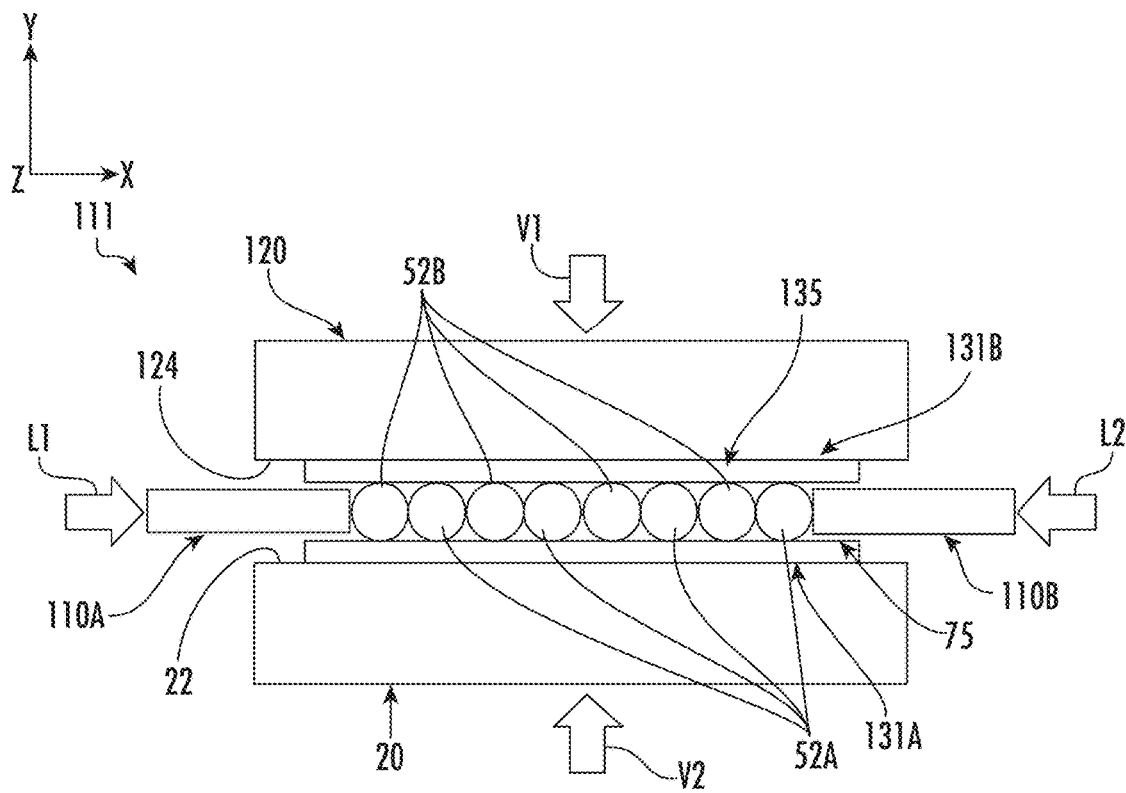
FIG. 3A illustrates a cross-section view of the assembly bench showing applied forces depicted by FIGS. 2A and 2B according to one or more embodiments described and illustrated herein.
Figure 3B:
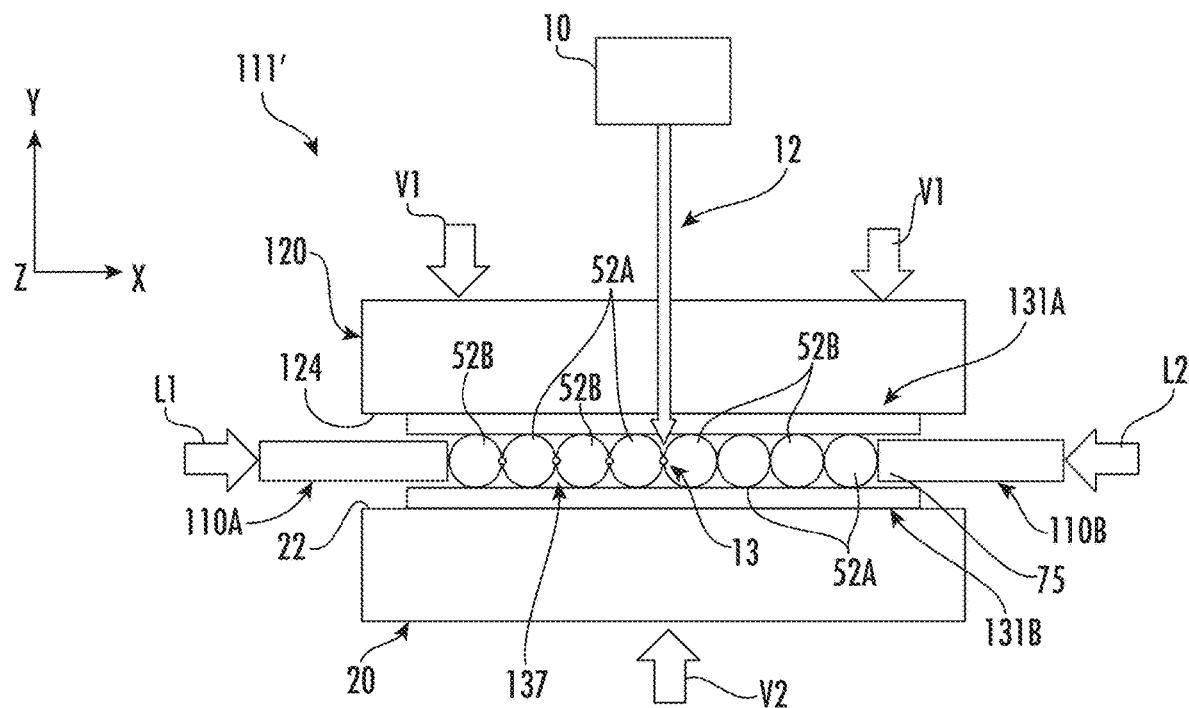
FIG. 3B illustrates a cross-section view of another example assembly bench for fabricating a fiber array spacer and/or an optical fiber assembly that employs laser-bonding according to one or more embodiments described and illustrated herein.

FIG. 3A provides a cross-section view looking down the axes of the interdigitated glass portions 74A, 74B. As shown in FIG. 3B, interdigitated glass portions 74A, 74B are an array of alternating first optical fibers 52A and second optical fibers 52B. The interdigitated glass portions 74A, 74B define an interdigitated array of optical fibers 75. The first and second pusher elements 110A, 110B may push the first optical fibers 52A and second optical fibers 52B such that there is substantially no gap between adjacent optical fibers. This may be beneficial in applications wherein the resulting fiber array spacer provides a V-groove surface on its top surface for placement of optical fibers. For example, center-to-center spacing between adjacent optical fibers may be determined by the diameter of the optical fibers, such as 125 μm, for example. In other embodiments, there is no requirement as to the spacing between adjacent optical fibers.

In some embodiments, a rigid mechanical bond can be formed between adjacent glass portions of optical fibers using laser joining technology. For example, metallized optical fibers are fabricated to enable soldered feedthrough ports in hermetically packaged phonic components (e.g., erbium pump amplifiers). Fiber metallization can involve deposition of a thin layer (e.g., 20-500 Å) of optically absorbing material (e.g., stainless steel, chromium). The additional metallization layer is sufficiently thin to not alter the diameter of the optical fiber beyond target specifications.

Referring now to FIG. 3B, an assembly bench 111' is modified to include a laser beam delivery system 10 that is positioned directly over the interdigitated array of optical fibers 75. The laser may be, without limitation, a Nd:YAG laser with a wavelength of 1.06 μm that delivers a laser beam 12 having pulses with 0.1-2.0 kW pulse power. A laser beam focal spot 13 (20-50 μm diameter) can be moved up-down and left-right so that the focus may be located at the joining interface between adjacent fibers.

After squeezing force is applied to the interdigitated array of optical fibers 75 the laser beam focal spot 13 is used to join each neighboring optical fiber 52A, 52B in the interdigitated array of optical fibers 75. Laser activation heats the optical fibers 52A, 52B where they contact each other so that the metal coating on adjacent optical fibers 52A, 52B melts and flows together. After laser heating is terminated the metal cools and solidifies, a metallized bond 137 is formed that holds the optical fibers 52A, 52B together. The laser bond 137 is confined to the contact region between adjacent optical fibers 52A, 52B so that the distance between the top and bottom surfaces of each optical fiber 52A, 52B equals the original fiber diameter.

The laser beam focal spot 13 can also be translated parallel to the optical fiber axis to provide a long, metallized bond between adjacent optical fibers 52A, 52B that may be more mechanically robust than bonding at a single point. The first and second release sheets 131A, 131B shown in FIG. 3B may not be needed if the interdigitated array of optical fibers 75 can be easily removed from the support plate 20 and the cover plate 120 after laser bonding.

Depending on the optical properties of cover plate 120 and the first release sheet 131A (if used), it may be desirable to split these components into two parts to provide an unobstructed optical path between the laser beam 12 and the interdigitated array of optical fibers 75. While these components are split, they are still able to provide vertical squeeze force in close proximity to laser bonding region. This ensures that during laser bonding the interdigitated array of optical fibers 75 are correctly aligned to each other and the top and bottom plates. The top plate can also be made of one piece of glass with a hole in the middle so that its left and right bottom surfaces are guaranteed to be coplanar.

Referring now to both FIGS. 3A and 3B, the elastic modulus of the first and second release sheets 131A, 131B may be sufficiently low to allow deformation of the release sheets during application of the first and second vertical forces V1, V2. Release sheet deformation should be approximately uniform across the interdigitated glass portions 74A, 74B, ensuring that the squeezed interdigitated glass portions 74A, 74B remains parallel to the support plate 20 and the cover plate 120. Release sheet deformation helps ensure that substantially no adhesive remains on the top and bottom surfaces of the interdigitated glass portions 74A, 74B so that the distance between these surfaces is precisely determined by the diameter of the optical fibers.

The first and second pusher elements 110A, 110B can be designed to be removed after fiber array spacer assembly. For example, if the pusher elements 110A, 110B are designed to only extend between the support plate 20 and the cover plate 120 by a small distance (e.g., 300-500 μm), it may be removed after adhesive curing. Adhesion of the adhesive to the pusher elements 110A, 110B may be prevented using non-stick coatings or other release materials.

In other embodiments, the first and second pusher elements 110A, 110B may be designed to break off in subsequent assembly steps so that the tip of the first and second pusher elements 110A, 110B remains. The length of the first and second pusher elements 110A, 110B may be extended to allow them to be used as a handle to simplify fiber array spacer positioning in subsequent assembly steps.

After adhesive curing (which may be by UV curing and/or thermal curing steps), the first and second multi-fiber cables 60A, 60B are removed from the assembly bench 111. If the first and second release sheets 131A, 131B are implemented as discrete sheets or films (as opposed to coatings), then the first and second release sheets 131A, 131B will initially remain on the interdigitated glass portions 74A, 74B as shown in FIG. 4A. After the removal of the first and second release sheets 131A, 131B, the assembly appears as shown in FIG. 4B. Note that the first or second cable jacket 61A, 61B is not shown in FIGS. 4A and 4B. Compression of the first and second release sheets 131A, 131B by the interdigitated glass portions 74A, 74B during assembly produces undulating top fiber surfaces T (i.e., first surfaces) and bottom fiber surfaces B (i.e., second surfaces). As shown in FIG. 4B, the top fiber surfaces T define a first plane $P_1$ and the bottom fiber surfaces B define a second plane $P_2$ that is parallel to the first plane $P_1$. The adhesive 135 does not extend beyond the first plane $P_1$ and the second plane $P_2$. This surface variation may reduce the influence of dust and debris during fiber array spacer stacking as described below.

The adhesive 135 used to join adjacent optical fibers may be a flexible low modulus adhesive, which allows the resulting fiber array spacer to conform to the surface it is placed on so that the fiber array spacer is positioned at a precision vertical offset from a mounting surface. A high modulus adhesive can also be used between adjacent optical fibers to produce a rigid fiber array spacer. This type of fiber array spacer may be desirable in applications where the fiber array spacer serves as a geometrical datum surface for additional elements that are joined to the fiber array spacer.

In some embodiments, the support plate 20 and/or the cover plate 120 are elements of the resulting fiber array spacer. Referring once again to FIGS. 3A and 3B, the first release sheet 131A and/or the second release sheet 131B may not be provided. Thus, the interdigitated array of optical fibers 75 will be bonded to the support plate 20 when the first release sheet 131A is not provided, and the interdigitated array of optical fibers 75 will be bonded to the cover plate 120 when the second release sheet 131B is not provided.

The support plate 20 and/or the cover plate 120 may be fabricated with a precise thickness. A glass support plate 20 can be fabricated with an extremely flat surface (e.g., deviation of less than 0.1 μm from an ideal plane) using fusion draw processes. The support plate 20 may be made of other materials, such as a CTE-matched silicon substrate, a glass-ceramic material, or a ceramic material. The same process can produce glass sheets with parallel top and bottom surfaces and precise thickness control. In these embodiments, the entire fiber array and its support plate can serve as a precision spacer.

FIG. 4C illustrates an embodiment wherein no first release sheet 131A is provided on the surfaces 22 of the support plate 20 such that the adhesive 135 bonds the interdigitated array of optical fibers 75 to the support plate 20 during the interdigitating process described above and illustrated by FIGS. 3A and 3B. This is a single step process It is also possible to fabricate an interdigitated array of optical fibers 75 bonded to the support plate 20 by a two-step process. First the interdigitated array of optical fibers 75 are fabricated as shown in FIG. 4B by the process of FIGS. 3A, 3B and 4A. Next, a layer of adhesive is applied to a support plate 20 to subsequently bond the interdigitated array of optical fibers 75 to the surface 22 of the support plate.

In each case, the lower support plate 20 may be a thin sheet of glass, or a fiber array spacer that is fabricated to be precisely flat (by forming between flat sheets, such as fusion drawn glass sheets).

FIG. 5A illustrates a first multi-fiber cable 60A and a second multi-fiber cable 60B that are joined at the interdigitated glass portions 74A, 74B by the process using the assembly bench 111 described above. Multiple fiber array spacers can be harvested from a single interdigitated array of optical fibers 75. As shown in FIG. 5A, the interdigitated array of optical fibers 75 is cut along a cut line CL, such as, without limitation, by scoring and breaking the bare fibers, diamond sawing, or laser cleaving.

Figure 5B:
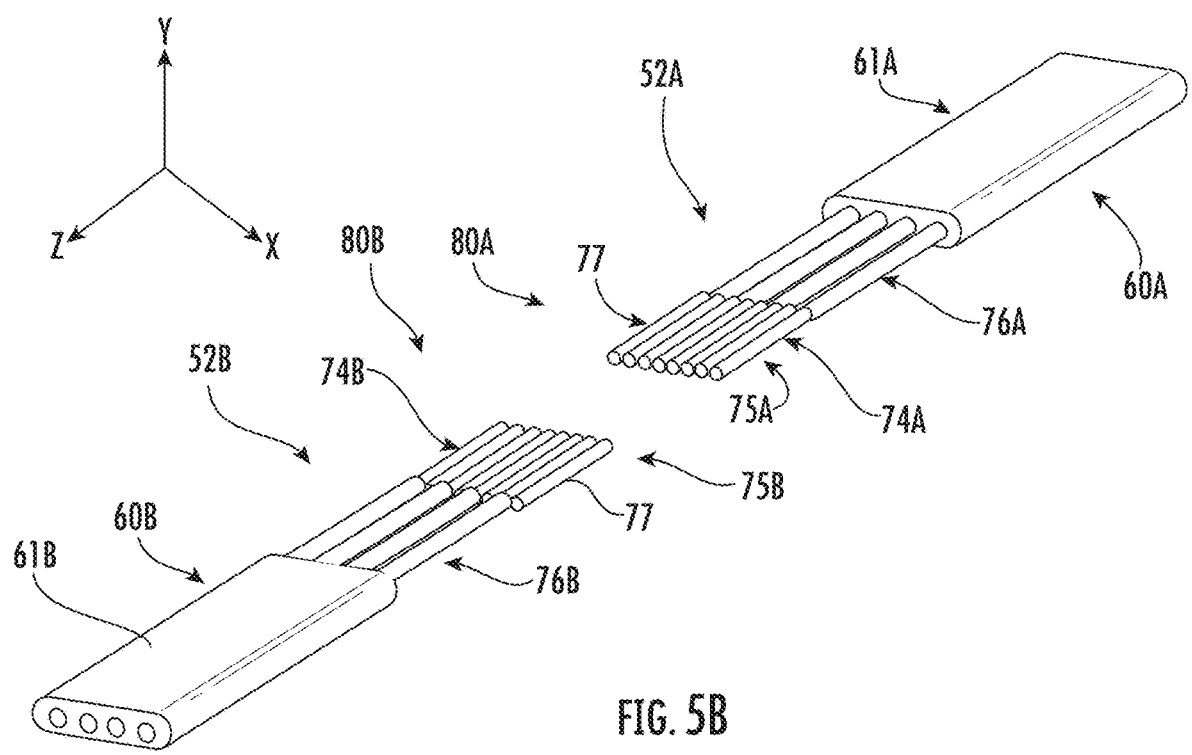
FIG. 5B illustrates an example first multi-fiber cable having a first interdigitated array of optical fibers and an example second multi-fiber cable having a second interdigitated array of optical fibers according to one or more embodiments described and illustrated herein.

After cutting, a first interdigitated array of optical fibers 75A is attached to the first multi-fiber cable 60A and a second interdigitated array of optical fibers 75B is attached to the second multi-fiber cable 60B, as shown in FIG. 5B. The first interdigitated array of optical fibers 75A comprises alternating first glass portions 74A of the first optical fibers 52A and spacer fibers 77 which are fiber stubs cut from the second optical fibers 52B of the second multi-fiber cable 60B. Fiber stubs are short lengths of optical fiber that do not pass optical signals. The second interdigitated array of optical fibers 75B comprises alternating second glass portions 74B of the second optical fibers 52B and spacer fibers 77 which are fiber stubs cut from the first optical fibers 52A of the first multi-fiber cable 60A.

In some applications, it is desirable for the fiber array spacer to remain attached to the multi-fiber cable to simplify handling and positioning of the fiber array spacer. In the embodiment shown in FIG. 5B, a first fiber array spacer 80A is defined by the first interdigitated array of optical fibers 75A and a second fiber array spacer 80B is defined by the second interdigitated array of optical fibers 75B.

Figure 5C:
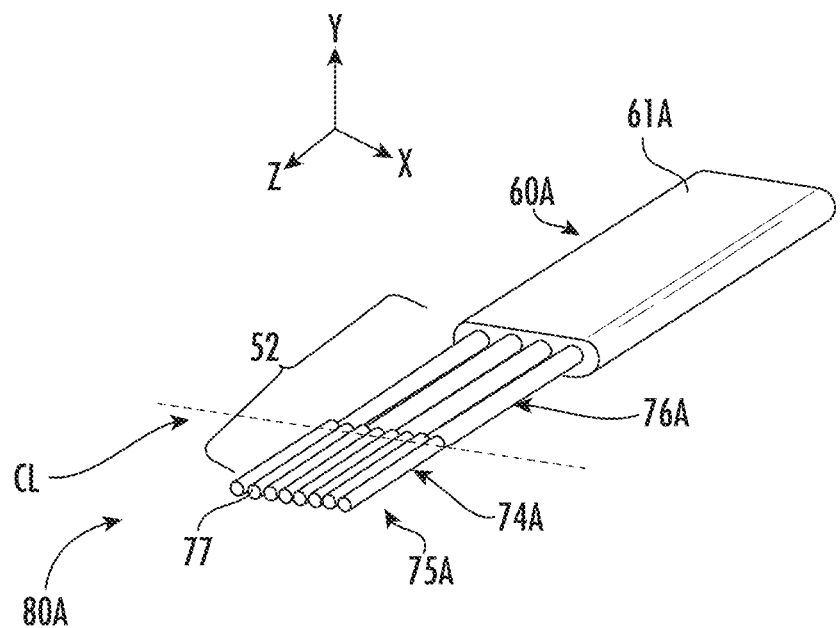
FIG. 5C illustrates the first multi-fiber cable having a first interdigitated array of optical fibers that is to be cut along a cut line according to one or more embodiments described and illustrated herein.
Figure 5D:
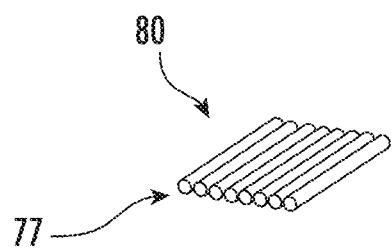
FIG. 5D illustrates an example fiber array spacer cut from the first multi-fiber cable illustrated by FIG. 5C according to one or more embodiments described and illustrated herein.

In other applications, an individual fiber array spacer without the attached multi-fiber cable may be desired. FIG. 5C illustrate a cut line CL that may be used to fully separate the first fiber array spacer 80A from the first multi-fiber cable 60A. FIG. 5D illustrates a fully separated fiber array spacer 80 that may be used in an optical device, such as an optical connector.

Although FIG. 5D illustrates a fiber array spacer 80 with substantially no gap between adjacent spacer fibers 77, embodiments are not limited thereto. For example, a gap may be present between adjacent spacer fibers 77. An adhesive may be present within the gaps to secure the individual spacer fibers 77 to one another. Additionally, the spacer fibers 77 do not need to be parallel to one another.

In some embodiments, the fiber array spacer 80 further includes a precision support plate 20 as shown in FIG. 4C and described above.

FIG. 6A illustrates how multiple cut lines CL may be used to separate multiple fiber array spacers 80 from a single interdigitated array of optical fibers 75. FIG. 6B illustrates three separated fiber array spacers 80 from the single interdigitated array of optical fibers 75 shown in FIG. 6A.

It is noted that a fiber array spacer may be fabricated with as few as two precision diameter optical fibers. In embodiments having just two optical fibers, the fiber array spacer will be most stable if it is fabricated with the two optical fibers spaced as far apart as is practical.

Referring now to FIG. 6C, in some embodiments, a fiber array spacer 80-1 may include at least two spacer fibers 77 that are spaced apart by an intermediary spacer sheet 78 having a height Hs that is less than the diameter of the spacer fibers 77 (e.g., the diameter of the cladding layer DCL). Having the Hs of the intermediary spacer sheet 78 ensures that only the upper and lower surfaces of the at least two spacer fibers 77 define the thickness of the fiber array spacer 80-1. The fiber array spacer 80-1 of FIG. 6C may be fabricated in a similar manner as shown in FIGS. 2A-4B and described above except internal spacer fibers are replaced by at least two outer spacer fibers 77. The intermediary spacer sheet 78 may be bonded to the spacer fibers 77 by an adhesive 135 as shown in FIG. 6C or it may be bonded to the spacer fibers 77 by laser bonding. The intermediary spacer sheet 78 may be fabricated from any suitable material. For example, the intermediary spacer may be a flexible elastomer or a rigid material, such as glass.

The fiber array spacer may also be fabricated with an integral support sheet (not shown) that stiffens the fiber array. For example, referring to FIGS. 3A and 3B, a support sheet may be provided between the interdigitated array of optical fibers 75 and the support plate 20. An adhesive bonds the interdigitated array of optical fibers 75 to the support sheet. The support sheet may be fabricated from any material that provides a flat surface, such as polished glass, ceramic, or metal materials. For example, a glass support sheet may be fabricated with an extremely flat surface (e.g., deviation of less than 0.1 μm from an ideal plane) using a fusion draw process. The support sheet may be rigid in some embodiments. However, the support sheet may also be thin enough to be flexible. If the support sheet is fabricated from metal, metalized optical fibers may be laser bonded to the support sheet by a laser bonding process as described above.

Figure 7A:
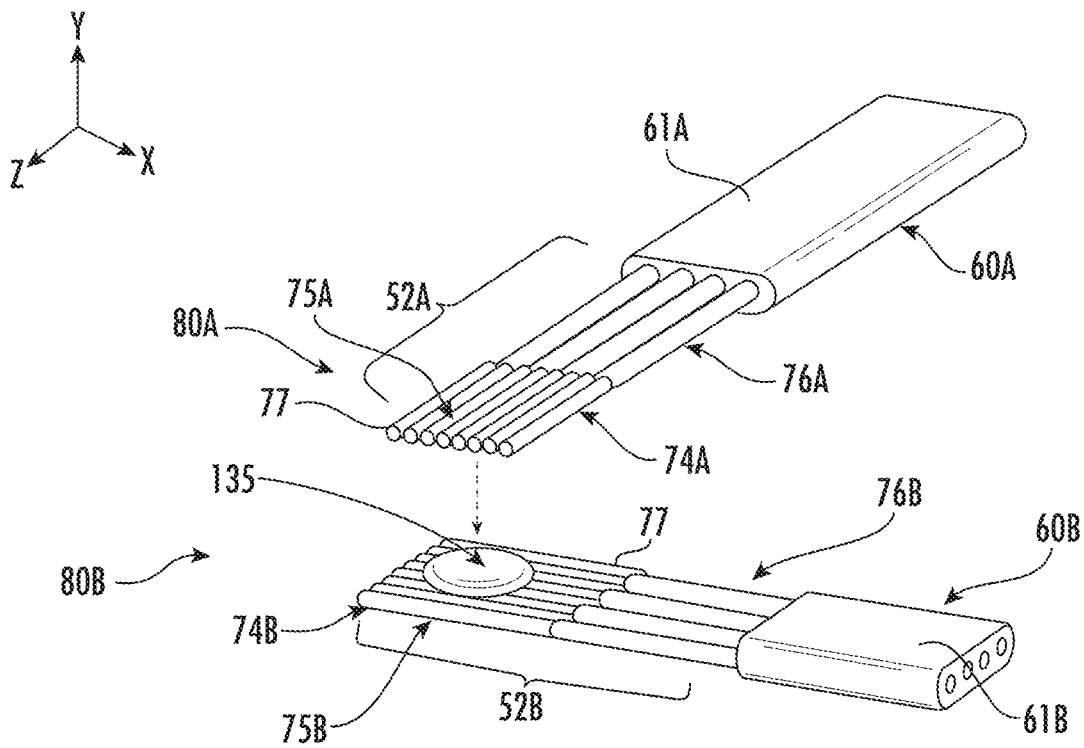
FIG. 7A illustrates a perspective view of an example process of fabricating an optical fiber assembly with a fiber array spacer or a two-layer fiber array spacer using a first multi-fiber cable and a second multi-fiber cable according to one or more embodiments described and illustrated herein.
Figure 7B:
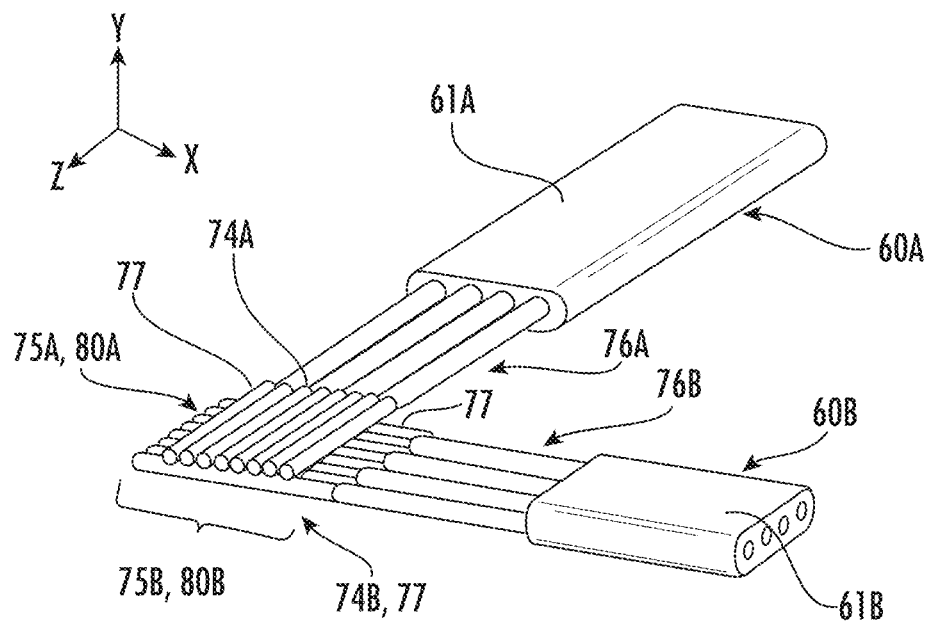
FIG. 7B illustrates a perspective view of another step in the example process of fabricating an optical fiber assembly with a fiber array spacer or a two-layer fiber array spacer according to one or more embodiments described and illustrated herein.

Referring now to FIG. 7A, a support sheet may be replaced by a second fiber array spacer that is positioned beneath a first fiber array spacer, thereby resulting in a two-layer fiber array spacer comprising optical fiber stubs. In FIG. 7A, the first multi-fiber cable 60A is arranged transverse to the second multi-fiber cable 60B. Adhesive 135 is applied to a top surface of the second interdigitated array of optical fibers 75B (i.e., a second fiber array spacer 80B still attached to the second multi-fiber cable 60B). Referring to FIG. 7B, the second interdigitated array of optical fibers 75B and the first interdigitated array of optical fibers 75A (i.e., a second fiber array spacer 80A still attached to the first multi-fiber cable 60A) are brought into contact with one another by vertical forces. The adhesive 135 is then cured to secure the first fiber array spacer 80A to the second fiber array spacer 80B, thereby forming a two-layer fiber array spacer 80'.

Although the spacer fibers 77 of the first fiber array spacer 80A are shown as orthogonal to the spacer fibers 77 of the second fiber array spacer 80B, embodiments are not limited thereto. The fiber stubs of the first fiber array spacer 80A and the second fiber array spacer 80B should be transverse to one another but an orthogonal arrangement is not required.

Figure 7C:
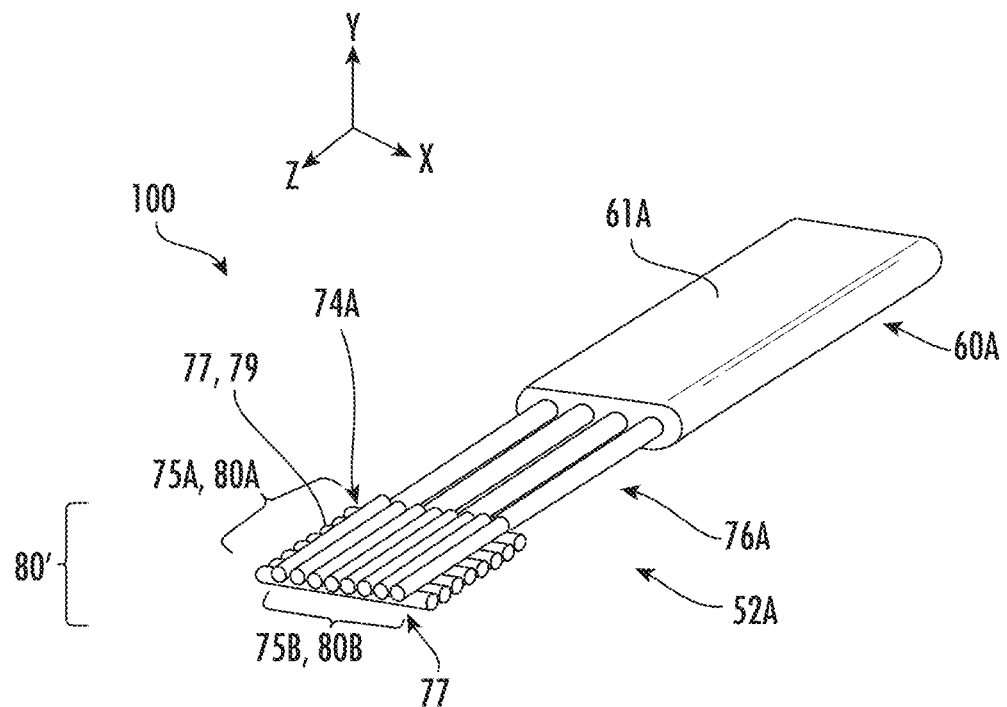
FIG. 7C illustrates a perspective view of an example optical fiber assembly wherein the second multi-fiber cable is cut away, or another step in fabricating a two-layer fiber array spacer according to one or more embodiments described and illustrated herein.

Excess fiber array material may be removed from the first fiber array spacer 80A and/or the second fiber array spacer 80B before or after adhesive joining. FIG. 7C illustrates a two-layer fiber array spacer 80' after the remaining portion of the second multi-fiber cable 60B is cut away and removed from the second fiber array spacer 80B. The remaining first optical fibers 52A and first cable jacket 61A may be used as a handle to support and align the two-layer fiber array spacer 80' during subsequent alignment and assembly operations.

Figure 8A:
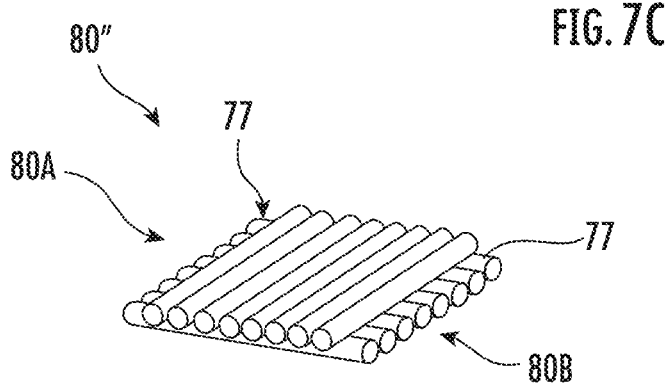
FIG. 8A illustrates a perspective view of an example two-layer fiber array spacer resulting from the process illustrated by FIGS. 7A-7C according to one or more embodiments described and illustrated herein.
Figure 8B:
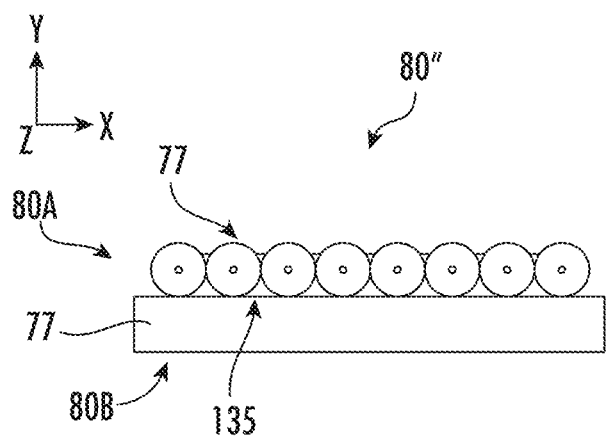
FIG. 8B illustrates a side view of the example two-layer fiber array spacer of FIG. 8A according to one or more embodiments described and illustrated herein.

FIG. 8A illustrates a perspective view of an example wherein the two-layer fiber array spacer 80" is separated from both the first multi-fiber cable 60A and the second multi-fiber cable 60B. FIG. 8B illustrates a cross-section view of the two-layer fiber array spacer 80" illustrated by FIG. 8A. The first layer is defined by a first fiber array spacer 80A having an array of spacer fibers 77 and the second layer is defined by a second fiber array spacer 80B having an additional array of spacer fibers 77.

Figure 9:
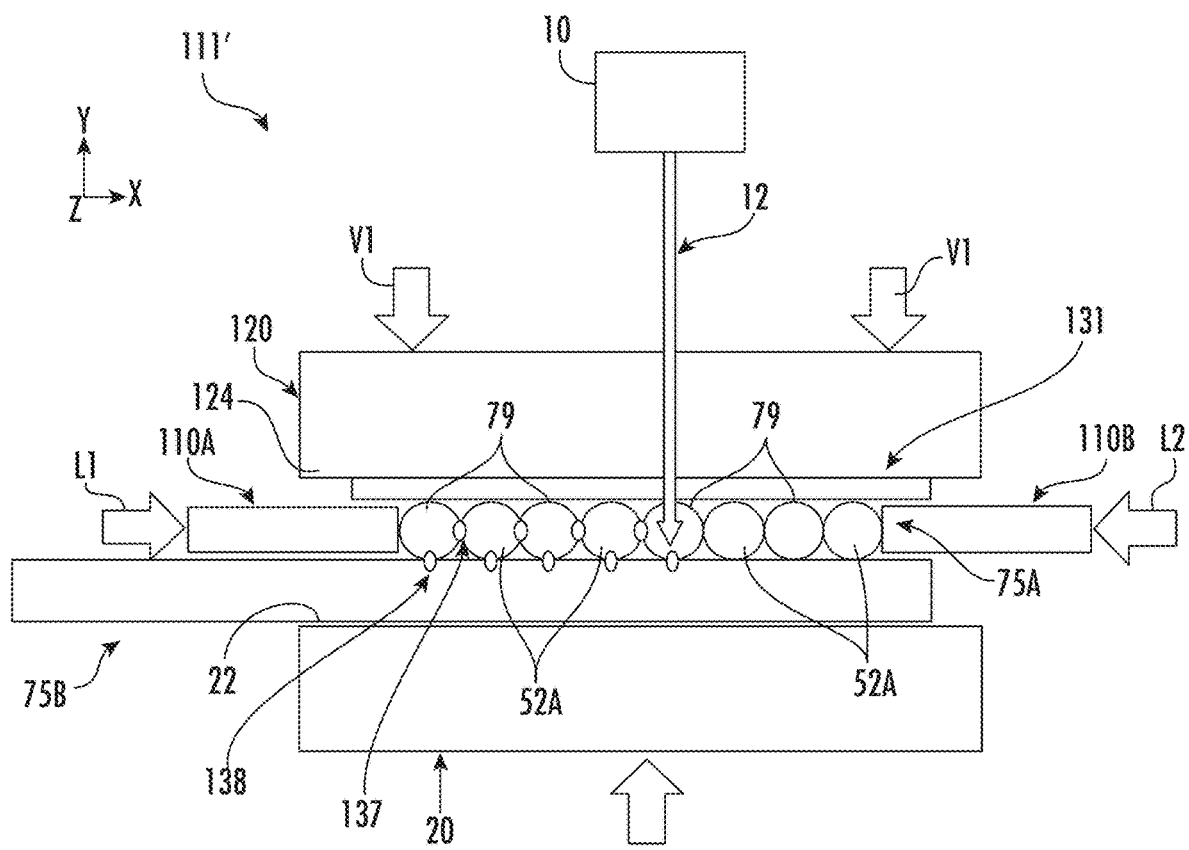
FIG. 9 illustrates a cross-section view of an example assembly bench to bond a first interdigitated array of optical fibers to a second interdigitated array of optical fibers according to one or more embodiments of the present disclosure described and illustrated herein.

Referring now to FIG. 9, a two-layer fiber array spacer with perpendicular fiber array spacers can also be assembled via a laser joining processes. FIG. 9 illustrates a cross-section view of an assembly bench 111' where a laser beam delivery system 10 is used to laser bond metallized optical fibers. Laser bonds 137 bond adjacent optical fibers within the same array of interdigitated optical fibers. Additionally, the laser bonds 137 bond the first interdigitated array of optical fibers 75A to the second interdigitated array of optical fibers 75B.

The advantage of the fiber array spacers described herein is that the optical fibers precisely set the thickness of the fiber array spacer. Therefore, if a precision spacer is required of a given thickness in an optical assembly (e.g., an optical connector) or any of the type of assembly not limited to optical assemblies, it can be fabricated by drawing optical fibers of the desired diameters. This is much easier to do than to, for example, draw a sheet of glass to a target thickness using a fusion draw process, or to polish a substrate to the target thickness. As an example, a series of optical fibers could be drawn at different standard diameters so that, by mixing and matching upper and lower fiber array spacer thicknesses, the desired combined thickness can meet the target thickness.

Another advantage is that the optical fibers provide lines of contact on both top and bottom surfaces that are more immune to debris contamination that would otherwise contribute to thickness errors during stacking. The cavities formed between the optical fibers during interdigitation provide a place for debris to flow through during surface mating. Meanwhile, the limited total surface area during optical fiber contact with other fiber arrays or flat sheets can produce high pressures that tends to compact debris to reduce its error contribution to stacking height.

Referring once again to FIG. 7C, the illustrated optical fiber assembly 100 may be utilized as a one-dimensional fiber array wherein the second fiber array spacer 80B is used as a spacing element in a final optical package, and the first interdigitated array of optical fibers 75A is used to transmit and/or receive optical signals. Thus, the first multi-fiber cable 60A is a fiber optical cable that may be housed in a connector body (see FIG. 14, described in more detail below). The optical fibers of the illustrated optical fiber assembly 100 comprise an array of interdigitated first glass portions 74A (from the first optical fibers 52A) and lateral spacer optical fibers 79 (cut from the second multi-fiber cable 60B as described above with respect to the spacer fibers 77). The first optical fibers 52A are signal optical fibers in the present embodiment because they propagate optical signals for optical communication. The lateral spacer optical fibers 79 are fiber stubs similar to the spacer fibers 77 and are therefore dummy optical fibers because they are not used for optical communication.

Figure 10:
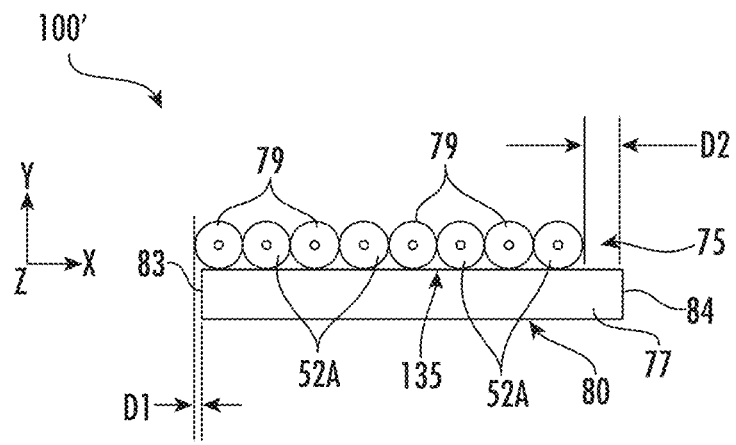
FIG. 10 illustrates an end view of an example optical fiber assembly according to one or more embodiments described and illustrated herein.

Prefabricated optical fiber assemblies (comprising a fiber array spacer and an array of interdigitated glass portions of optical fibers and spacer fibers) can be stacked to implement two-dimensional optical fiber arrays. In one approach shown in FIG. 10, optical fiber assemblies 100 as shown in FIG. 7C are used, where a one-dimensional array of signal optical fibers 52A are on precise pitch provided by lateral spacer optical fibers 79 and supported by a fiber array spacer 80 of spacer fibers 77. The fiber array spacer 80 is shifted laterally relative to the interdigitated array signal optical fibers 52A and lateral spacer optical fibers so that it undercuts the interdigitated array by a distance D1, where 0 µm≤D1≤D/2, and where D is the optical fiber diameter. The opposite end of the fiber array spacer 80 extends beyond the interdigitated array by a distance D2, where, for example, 0.5 mm≤D1≤2 mm. These offsets aid the assembly of two-dimensional optical fiber arrays as described below.

Figure 11:
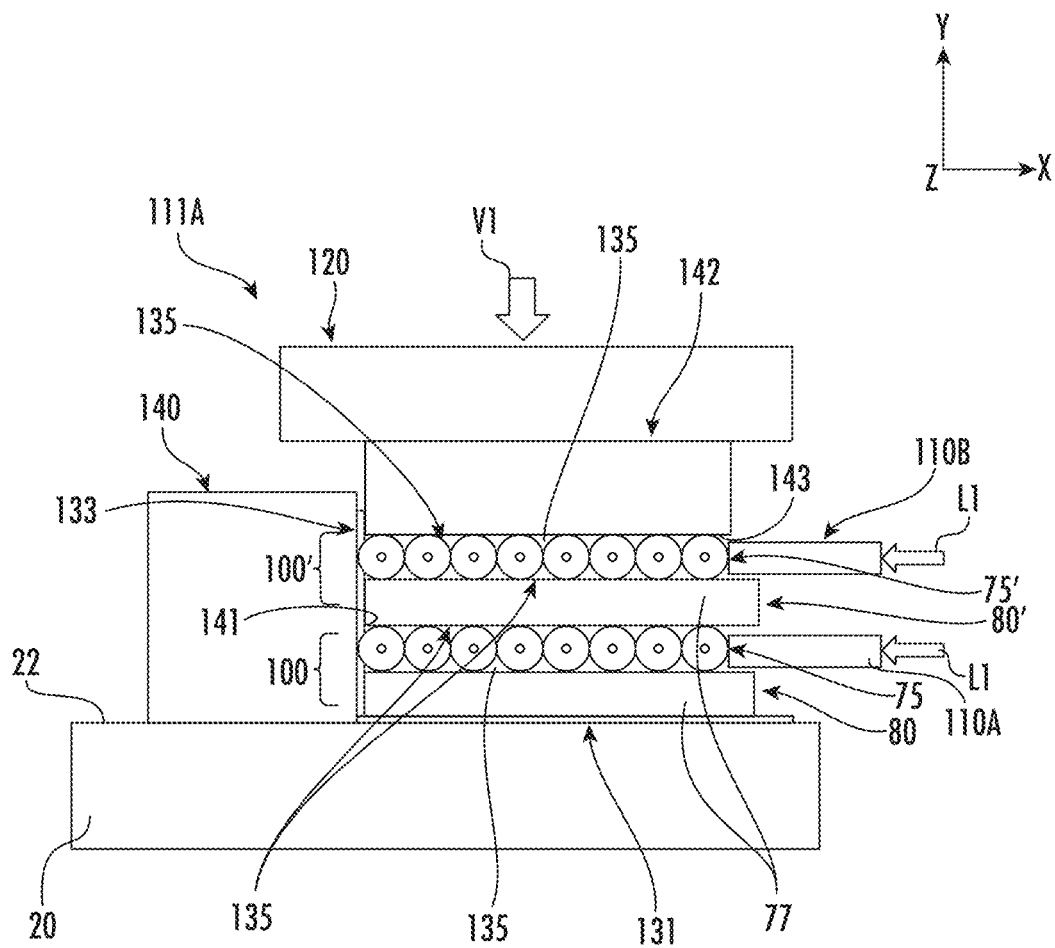
FIG. 11 illustrates a cross-section view of an example assembly bench for fabricating a two-dimensional optical fiber array according to one or more embodiments described and illustrated herein.

Referring now to FIG. 11, an assembly bench 111A may be constructed by mounting a precision vertical alignment block 140 on a precision flat surface 22 of a support plate 20. The precision flat surface 22 of the support plate 20 serves as the bottom-side alignment surface. The precision flat surface 141 of the vertical alignment block 140 serves as the left-side alignment surface. Together, the precision vertical alignment block 140 and the support plate 20 provide a precise right-angle corner that enables left-right alignment of first and second interdigitated array of optical fibers 75, 75'. In some embodiments, the vertical alignment block 140 and the support plate 20 serving as a horizontal alignment block are integrated into a single, right angle component.

In the illustrated embodiment, a first optical fiber assembly 100 comprising a first fiber array spacer 80 is disposed on a release sheet 131 on a precision flat surface 22 of the support plate 20. A first interdigitated array of optical fibers 75 of the first fiber optical assembly 100 is secured to the first fiber array spacer 80 as described above. A second optical fiber assembly 100' comprising a second fiber array spacer 80' secured to a second interdigitated array of optical fibers 75' is stacked onto the first optical fiber assembly 100 such that the second fiber array spacer 80' is positioned on the first interdigitated array of optical fibers 75. An additional top precision spacer sheet 142 (e.g., precision flat fusion glass) is applied on the second interdigitated array of optical fibers 75', and a cover plate 120 is positioned on the top precision spacer sheet 142. In some embodiments, no top precision spacer sheet 142 is provided. Alternatively, a release sheet may be provided on the bottom surface 143 of the top precision spacer sheet 142 such that the precision support sheet is not a component of the resulting two-dimensional optical fiber array.

Downward force V1 applied using the cover plate 120 forces the first and second optical fiber assemblies 100, 100' into contact with each other. Adhesive 135 is applied between the first and second optical fiber assemblies 100, 100'. The adhesive 135 is prevented from attaching to the vertical alignment block 140 and the support plate 20 by use of first and second release sheets 133, 131, respectively. As stated above, the first and second release sheets 133, 131 may be configured as individual sheets, or a coating, such as a fluorosilane coating, for example.

The first and second optical fiber assemblies 100, 100' are pushed laterally into the precision flat surface 141 of the vertical alignment block 140 using first and second pusher elements 110A, 110B that contact the outermost optical fibers in the first and second interdigitated array of optical fibers 75, 75', respectively. The first and second pusher elements 110A, 110B are guided into contact with the outermost optical fibers by the portions of the fiber array spacers 80, 80' that extend a distance D2 to the right (see FIG. 10). The first and second pusher element 110A, 110B force the outermost optical fiber in each interdigitated array of optical fibers be pushed into contact with the release sheet 133 attached to the vertical alignment block 140. Since the thickness of the release sheet 133 is precisely controlled, the optical fibers in the first and second interdigitated array of optical fibers 75, 75' become vertically aligned to each other (i.e., each fiber core is located directly over the fiber core beneath it). This causes all optical fibers in the two-dimensional optical fiber array to be precisely located relative to one another in a grid. In this example, the two-dimensional horizontal fiber array pitch equals twice the optical fiber diameter, while the two-dimensional vertical fiber array pitch equals the sum of the optical fiber diameter and the spacer fiber 77 diameter.

Figure 12:
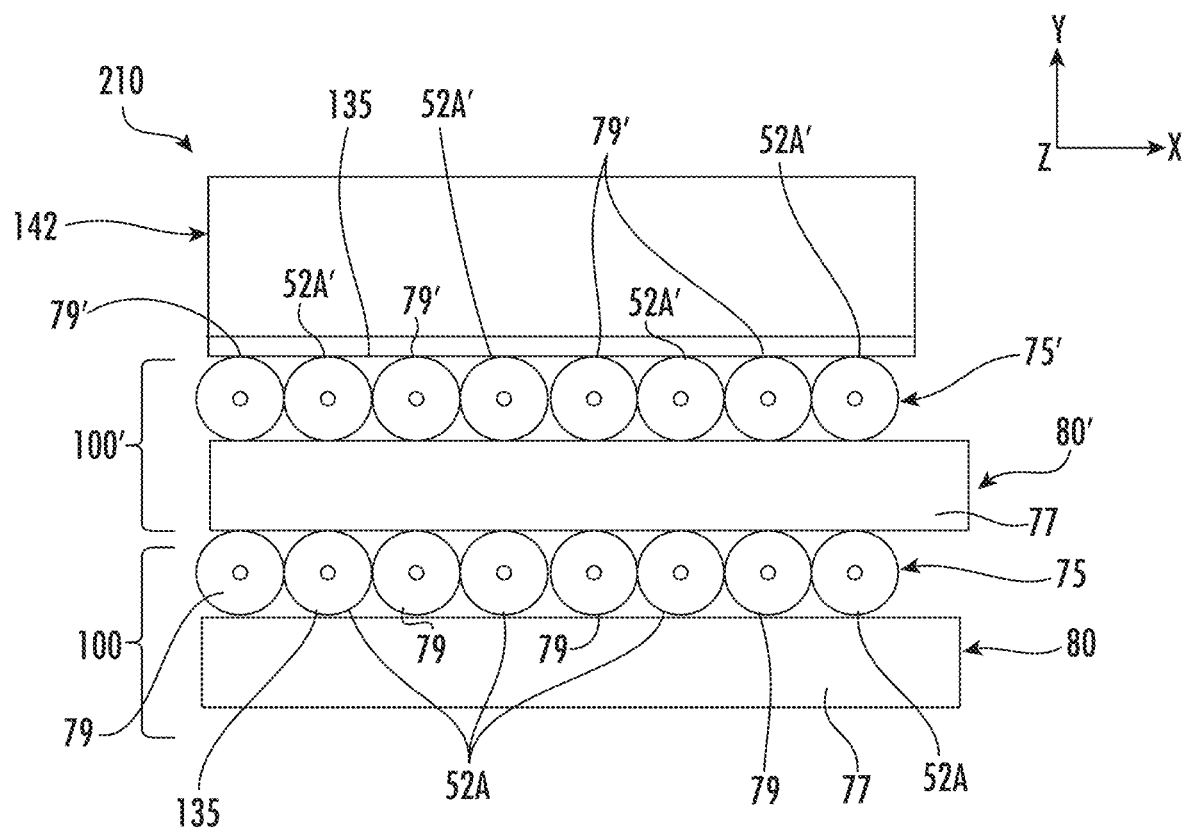
FIG. 12 illustrates a cross-section view of an example two-dimensional optical fiber array according to one or more embodiments described and illustrated herein.

After adhesive UV exposure and curing, the two-dimensional optical fiber array 210 is removed from the assembly bench 112, as shown in FIG. 12. The two-dimensional optical fiber array 210 may be disposed in an optical connector, for example. The first interdigitated array of optical fibers 75 comprises alternating lateral spacer optical fibers 79 and signal optical fibers 52A and is supported by the first fiber array spacer 80. The second interdigitated array of optical fibers 75' comprises alternating lateral spacer optical fibers 79' and signal optical fibers 52A' and is supported by the second fiber array spacer 80'.

Figure 13A:
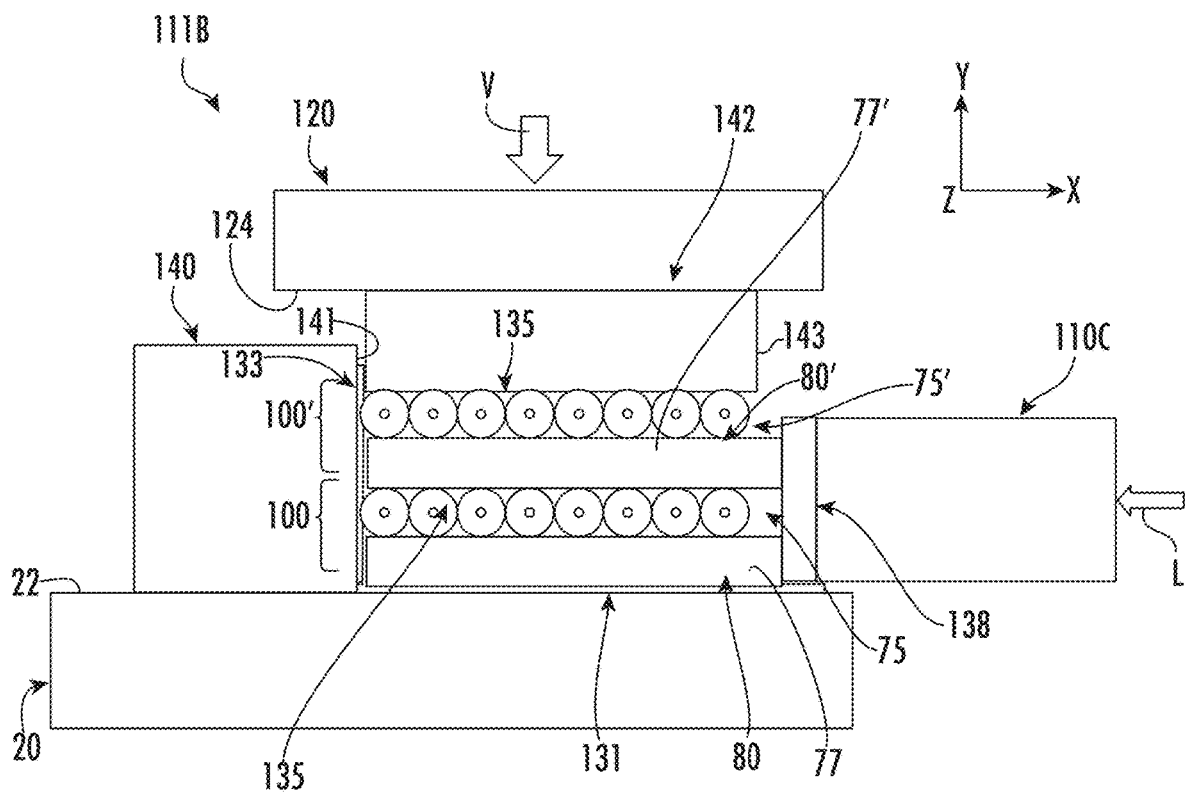
FIG. 13A illustrates a cross-section view of another example assembly bench for fabricating a two-dimensional optical fiber array according to one or more embodiments described and illustrated herein.

FIG. 13A depicts another assembly bench 111B for assembling a two-dimensional optical fiber array that is similar to the assembly bench 111A illustrated by FIG. 11. In this embodiment, an extended length of the spacer fibers 77, 77' of the first and second fiber array spacers 80, 80', respectively, is used to simplify the process of forcing the outermost optical fibers (i.e., leftmost optical fibers in FIG. 13) of the first and second interdigitated array of optical fibers 75, 75' against the precision flat surface 141 of the vertical alignment block 140. A large pusher element 110C (e.g., a pusher block) contacts the spacer fibers 77, 77' and applies a lateral force L. The pusher element 110C may have a thickness that is closely matched to the total thickness of stack of first and second fiber optic assemblies 100, 100'. In the illustrated embodiment, an elastomeric pad 138 is disposed on the end of the pusher element 110C so that force is transferred to each spacer fiber 77, 77', even if the spacer fibers 77, 77' are of different lengths.

Figure 13B:
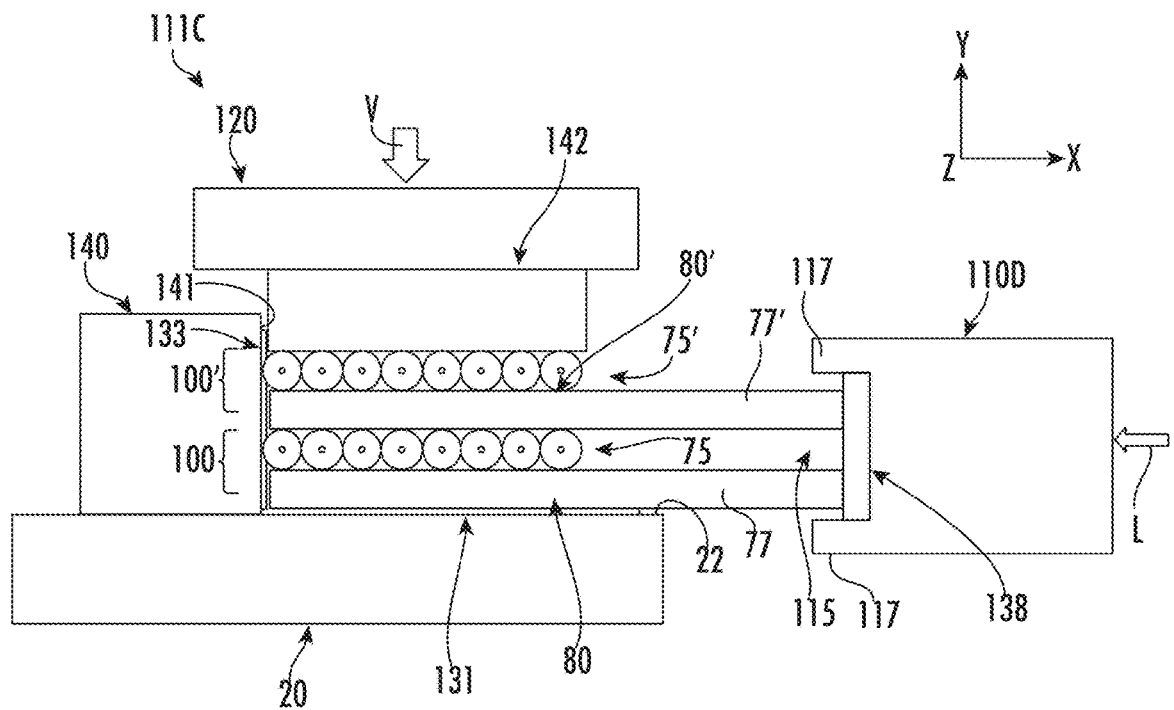
FIG. 13B illustrates a cross-section view of another example assembly bench for fabricating a two-dimensional optical fiber array according to one or more embodiments described and illustrated herein.

FIG. 13B depicts another assembly bench 111C for assembling a two-dimensional optical fiber array that is similar to the assembly bench 111B illustrated by FIG. 13A. In this example, an extended length of the spacer fibers 77, 77' of the first and second fiber array spacers 80, 80', respectively, is such that D2 (see FIG. 10) is approximately 3-5 mm. This additional length allows the spacer fibers 77, 77' to flex as force is applied to them via a pusher element 110D, such as first and second pusher elements 110A, 110C (see FIG. 3A) configured as pusher fibers that squeeze the first and second optical fibers 52A, 52B to form an interdigitated array. The example pusher element 110D is configured as a block having a pocket 115 with raised shoulders 117 that prevents the deflected spacer fibers 77, 77' from slipping off of the end of the pusher element 110D. The elastomeric pad 138 may or may not be utilized in this embodiment. After alignment and adhesive curing, the excess length of the spacer fibers 77, 77' may be removed via cutting or grinding operations.

Figure 13C:
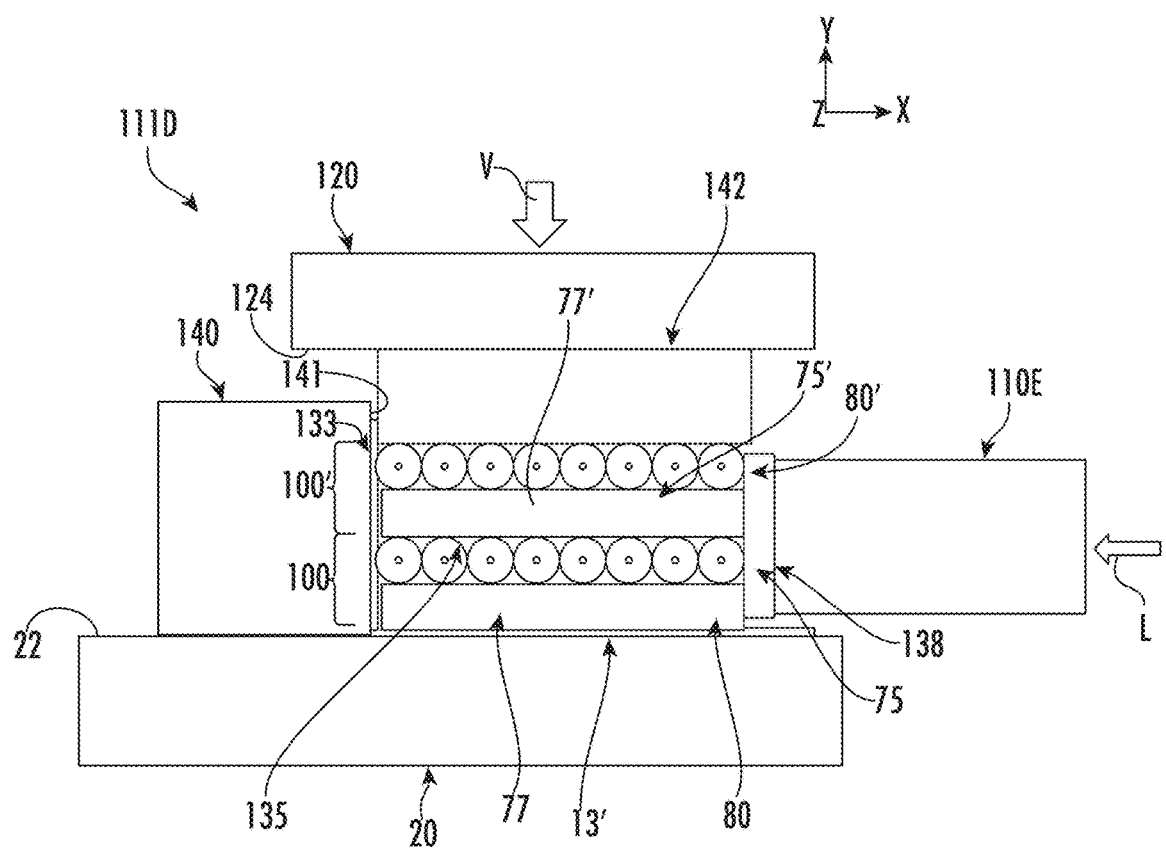
FIG. 13C illustrates a cross-section view of another example assembly bench for fabricating a two-dimensional optical fiber array according to one or more embodiments described and illustrated herein.

Referring now to FIG. 13C, another assembly bench 111D for assembling a two-dimensional optical fiber array that is similar to the assembly benches 111B and 111C illustrated by FIGS. 13A and 13B. In this example, the spacer fibers 77, 77' are reduced in length such that D2 (see FIG. 10) is approximate 0 μm. Thus, the ends of the spacer fibers 77, 77' line up with outer optical fibers (i.e., rightmost optical fibers) in each of the first and second interdigitated arrays of optical fibers 75, 75'. A pusher element 110E having an elastomeric pad 138 on the end is used to simultaneously push the first and second optical fiber assemblies 100, 100' into the release sheet 133 on the precision flat surface 141 of the vertical alignment block 140.

Figure 13D:
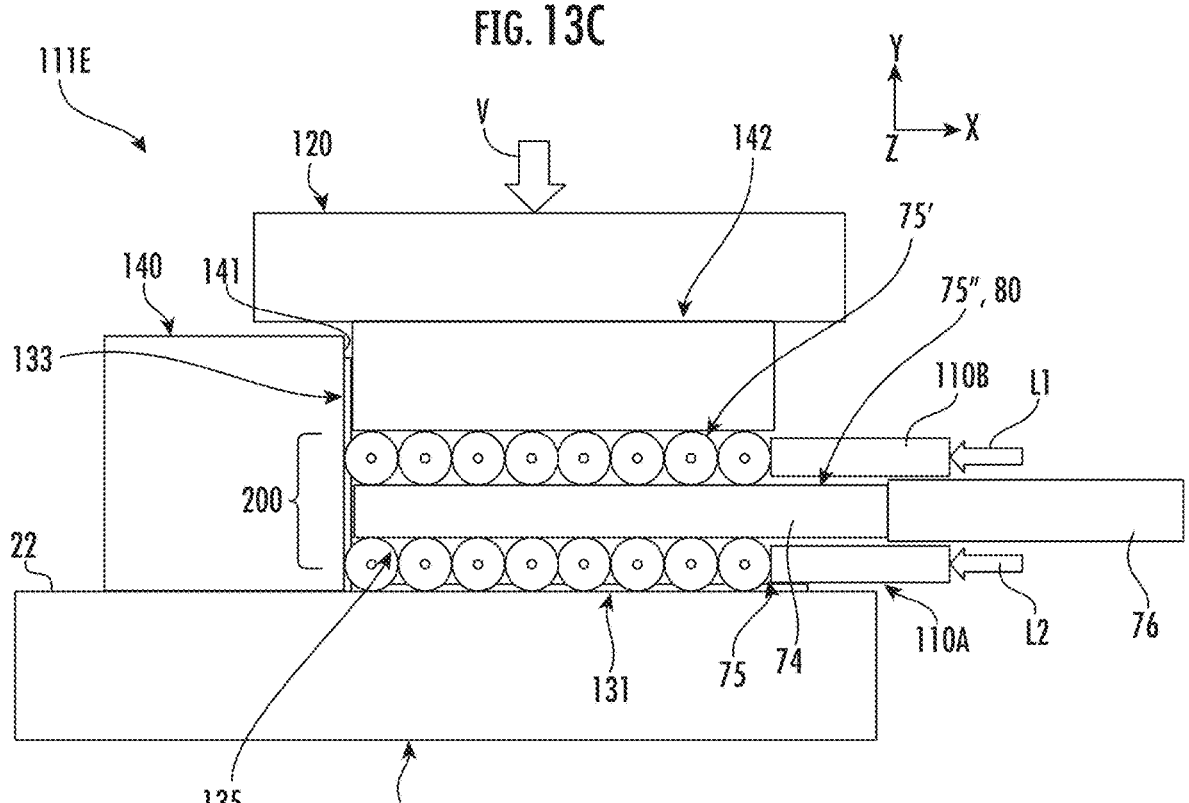
FIG. 13D illustrates a cross-section view of another example assembly bench for fabricating a two-dimensional optical fiber array according to one or more embodiments described and illustrated herein.

Referring to FIG. 13D, a two-dimensional optical fiber array 200 may be fabricated using only one fiber array spacer 80 that is disposed between a first interdigitated array of optical fibers 75 and a second interdigitated array of optical fibers 75'. In the example, a first interdigitated array of optical fibers 75 is disposed on a first release sheet 131 on the precision flat surface 22 of the support plate 20 of an example assembly bench 111E. Next, a support interdigitated array of optical fibers 75" is disposed on the first interdigitated array of optical fibers 75 such that its longitudinal axis is transverse (e.g., perpendicular) to the longitudinal axis of the first interdigitated array of optical fibers 75. As used herein, "perpendicular" means within ±5 degrees of 90 degrees. The support interdigitated array of optical fibers 75" will become spacer fibers 77 upon cutting the glass portion 74 and separating the coating portion 76 from the assembly. The second interdigitated array of optical fibers 75' are disposed on the support interdigitated array of optical fibers 75". A vertical force V is applied by way of the cover plate 120 to establish the position of the first and second interdigitated arrays of optical fibers 75, 75' in the Y-direction. First and second pusher elements 110A, 110B apply lateral forces L1, L2 to the first and second interdigitated array of optical fibers 75, 75', respectively, to force the outermost optical fibers (e.g., the leftmost optical fibers) first and second interdigitated array of optical fibers 75, 75' into contact with the release sheet 133 on the precision flat surface of the vertical alignment block 140. After adhesive curing, the fiber assembly is removed from the vertical alignment block 140, the support plate 20, and the cover plate 120. The excess optical fiber of the support interdigitated array of optical fibers 75" is removed by cutting, thereby forming a fiber array spacer 80 disposed between the first and second interdigitated arrays of optical fibers 75, 75'.

Figure 13E:
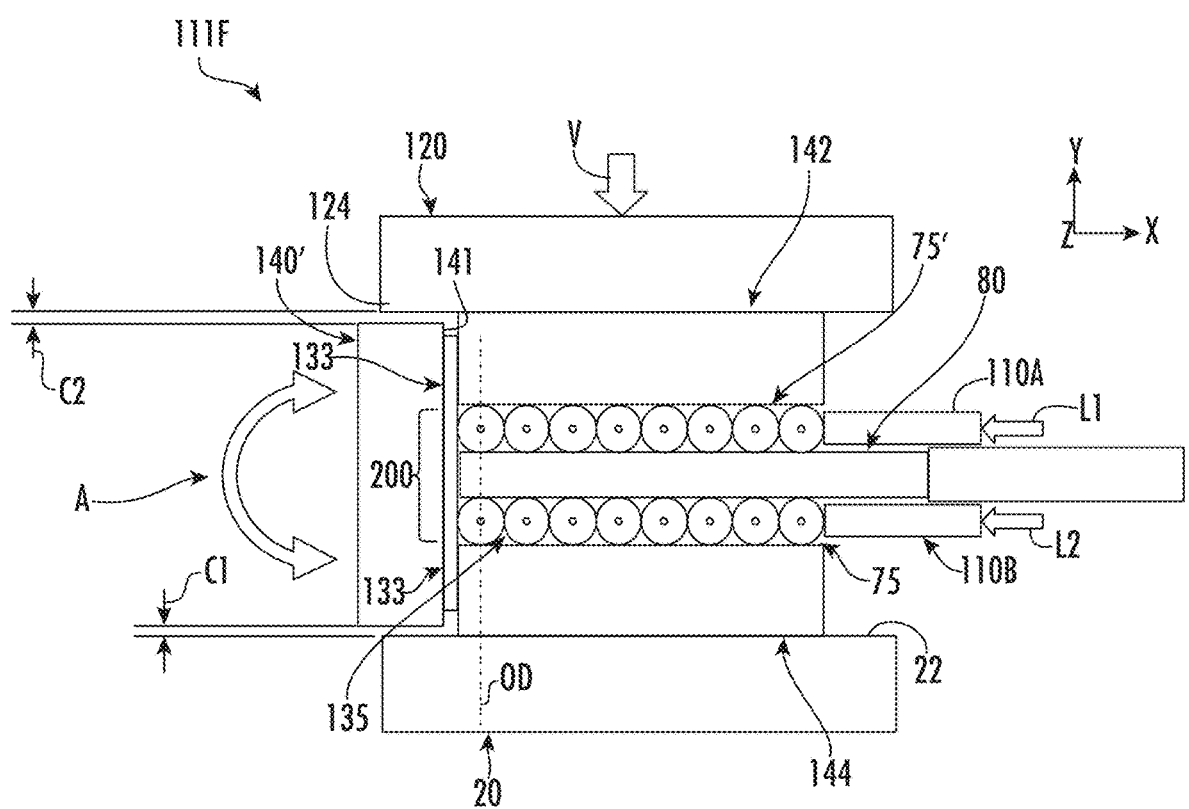
FIG. 13E illustrates a cross-section view of another example assembly bench for fabricating a two-dimensional optical fiber array according to one or more embodiments described and illustrated herein.

FIG. 13E illustrates another example assembly bench 111F that may be utilized to fabricate two-dimensional fiber arrays of various configurations. Particularly, a vertical alignment block 140 is mounted on a precision rotation stage (represented by array A) that is capable of rotating relative to a fixed support plate 20. In the illustrated embodiment, a two-dimensional optical fiber array 200 as illustrated by FIG. 13D is disposed on a bottom precision spacer sheet 144 (e.g., a precision fusion drawn glass sheet). The bottom precision spacer sheet 144 provides clearance C1 for the vertical alignment block 140 to rotate. In cases where the bottom precision spacer sheet 144 is not desired in the final product, a release sheet may be provided on the top surface of the bottom precision spacer sheet 144.

In the example of FIG. 13E, a top precision spacer sheet 142 is disposed on the second interdigitated array of optical fibers 75'. The top precision spacer sheet 142 provides clearance C2 for the vertical alignment block to rotate. In cases where the top precision spacer sheet 142 is not desired in the final product, a release sheet may be provided on the bottom surface of the top precision spacer sheet 142.

A precise right angle between the vertical alignment block 140' and the support plate 20 may be established by placing a right-angle gage block on the support plate 20 and adjusting the vertical alignment block 140' until it is parallel with the vertical side face of the right angle gage block. Alternatively, the vertical alignment block 140' may be aligned via optical power peaking of retro-reflected light from a collimator that produces a precise beam that extends parallel to the support plate 20. Thus, a light signal parallel to the precision flat surface 22 of the support plate 20 may be emitted such that it is reflected by the precision flat surface 141 of the vertical alignment block 140'. The reflected light signal is detected by a detector, and the vertical alignment block 140' is rotated until peak-power is received at the detector.

The angular adjustment of the vertical alignment block 140' enables different configurations of the two-dimensional fiber array. For example, it is possible to fabricate two-dimensional fiber arrays where the optical fiber cores are not positioned directly on top of one another but rather offset laterally along the X-direction by a precise offset distance. FIG. 13 depicts an offset distance OD of zero. However, rotation of the vertical alignment block 140' causes an offset distance OD between the cores of stacked optical fibers to be present.

Any of the fiber array spacers and the fiber arrays described herein may be implemented in any optical component. The precision diameter of the optical fibers used to fabricate the fiber spacers enable a low-cost method of setting the position of the signal optical fibers (or waveguides) along the X-axis.

Figure 14:
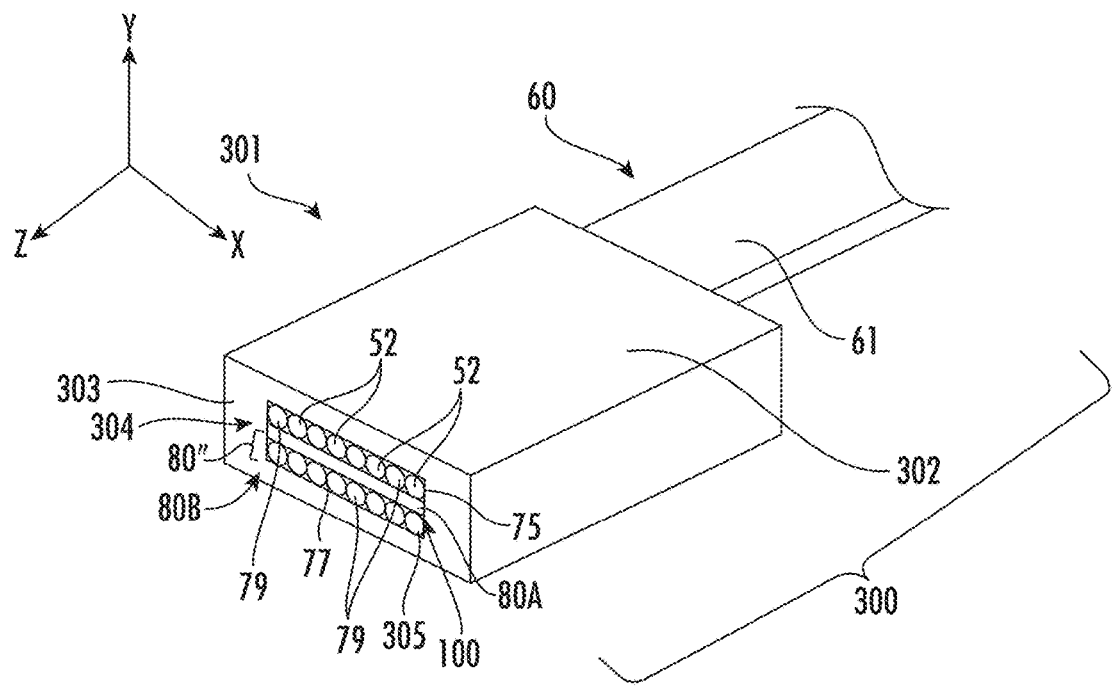
FIG. 14 illustrates a perspective view of an example optical connector for an optical cable assembly having a two-dimensional optical fiber array and a fiber array spacer according to one or more embodiments described and illustrated herein.

Referring now to FIG. 14, an optical component in the form of a fiber optic connector 301 for an optical cable assembly 300 is illustrated. The example fiber optic connector 301 has a connector body 302 having a mating face 303 that may be mated to a receptacle, a waveguide assembly (e.g., a waveguide assembly of a photonic integrated circuit (PIC)), or any other optical component. The connector body 302 may take on any shape and include any retention features to facilitate physical mating.

The mating face 303 has an opening 304 that exposes an end face of an optical fiber assembly 100 disposed within connector body 302. The optical fiber assembly 100 includes a one-dimensional interdigitated array of optical fibers 75 comprising alternating spacer fibers 79 and signal optical fibers 52 of a multi-fiber ribbon cable 60. The interdigitated array of optical fibers 75 is supported on a two-layer precision fiber array spacer 80" that precisely establishes a height of the end faces of the signal optical fibers 52 with respect to a bottom surface 305 of the opening by the precise diameter of the spacer fibers 77.

It should be understood that multi-dimensional fiber arrays may be utilized, and any number of signal optical fibers may be provided. Any of the fiber array spacers and fiber arrays described herein may be provided within a connector.

Figure 15:
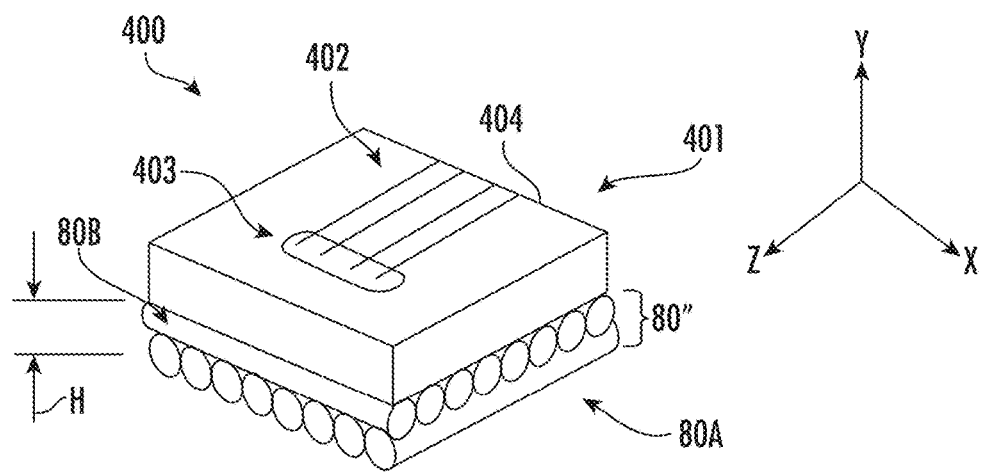
FIG. 15 illustrates a perspective view of an example optical assembly comprising a photonic integrated circuit coupled to a two-layer fiber array spacer according to one or more embodiments described and illustrated herein.

The fiber array spacers described herein may also be employed in photonics applications. FIG. 15 illustrates an example photonics assembly 400 comprising PIC 401 mounted on a two-layer fiber array spacer 80". The PIC 401 may be bonded to the two-layer fiber array spacer 80" by adhesive or by laser bonding, for example. The PIC 401 has a plurality of integrated waveguides 402 that are optically coupled to one or more active optical components 403 (e.g., optical emitters and/or optical receivers) and terminate at an optical coupling face 404.

The two-layer fiber array spacer 80" includes a first fiber array spacer 80A and a second fiber array spacer 80B. The height h of the two-layer fiber array spacer 80" is equal to the diameter of the spacer fibers of the first fiber array spacer 80A plus the diameter of the spacer fibers of the second fiber array spacer 80B. The two-layer fiber array spacer 80" precisely sets the location of the end-faces of the waveguides 402 along the Y-axis, thereby enabling precision coupling with an optical component that mates to the PIC 401 at the optical coupling face 404.

It should be understood that the embodiments described herein may be implemented in any optical component and are not limited to the fiber optic connector 301 of FIG. 14 and the photonics assembly of FIG. 15.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. An optical fiber assembly comprising:
   a fiber array spacer comprising:
   an array of spacer fibers, wherein individual spacer fibers of the array of spacer fibers are bonded to one another and each individual spacer fiber of the array of spacer fibers comprises a first surface defining a first plane and a second surface defining a second plane parallel to the first plane; and
   a fiber ribbon comprising an array of optical fibers, wherein:
      each optical fiber of the array of optical fibers comprises a glass portion; and
      the glass portion of each optical fiber of the array of optical fibers is bonded to the first surface of the fiber array spacer such that a longitudinal axis of the individual spacer fibers is transverse to a longitudinal axis of individual optical fibers of the array of optical fibers.

2. The optical fiber assembly of claim 1, further comprising an additional fiber array spacer, the additional fiber array spacer comprising:
   an additional array of spacer fibers, wherein:
      individual spacer fibers of the additional array of spacer fibers are bonded to one another; and
      the additional array of spacer fibers is bonded to the array of optical fibers such that the longitudinal axis of the individual spacer fibers of the additional array of spacer fibers is transverse to the longitudinal axis of individual optical fibers of the array of optical fibers, and the array of optical fibers is disposed between the fiber array spacer and the additional fiber array spacer.

3. The optical fiber assembly of claim 2, further comprising an additional fiber ribbon comprising an additional array of optical fibers, wherein:
   each optical fiber of the additional array of optical fibers comprises a glass portion; and
   the glass portion of each optical fiber of the additional array of optical fibers is bonded to the additional fiber array spacer such that a longitudinal axis of the individual spacer fibers of the additional fiber array spacer is transverse to a longitudinal axis of individual optical fibers of the additional array of optical fibers.

4. The optical fiber assembly of claim 1, further comprising an additional fiber ribbon comprising an additional array of optical fibers, wherein:
   the glass portion of each optical fiber of the array of optical fibers is bonded to a first side of the fiber array spacer; and
   a glass portion of each optical fiber of the additional array of optical fibers is bonded to a second side of the fiber array spacer.

5. The optical fiber assembly of claim 1, further comprising an additional fiber array spacer comprising:
   an additional array of spacer fibers, wherein:
      individual spacer fibers of the additional array of spacer fibers are bonded to one another; and
      the additional array of spacer fibers is bonded to the fiber array spacer such that the longitudinal axis of the individual spacer fibers of the additional array of spacer fibers is transverse to the longitudinal axis of the individual spacer fibers of the array of spacer fibers.

6. The optical fiber assembly of claim 1, wherein the glass portion of each optical fiber of the array of optical fibers is bonded to the fiber array spacer by an adhesive.

7. The optical fiber assembly of claim 1, wherein the glass portion of each optical fiber of the array of optical fibers is bonded to the fiber array spacer by laser bonding.

8. The optical fiber assembly of claim 1, wherein:
   the array of optical fibers comprises an interdigitated array of optical fibers comprising signal optical fibers and lateral spacer optical fibers; and
   the lateral spacer optical fibers are optical fiber stubs.

9. The optical fiber assembly of claim 8, wherein the signal optical fibers and the lateral spacer optical fibers of the interdigitated array of optical fibers are bonded to one another.

10. The optical fiber assembly of claim 1, wherein the glass portion of each optical fiber of the array of optical fibers is bonded to the fiber array spacer such that the longitudinal axis of individual spacer fibers of the array of spacer fibers is perpendicular to the longitudinal axis of individual optical fibers of the array of optical fibers.

11. The optical fiber assembly of claim 1, further comprising a connector body, wherein the fiber array spacer is disposed within the connector body.

12. The optical fiber assembly of claim 1, wherein:
   an adhesive disposed between adjacent spacer fibers does not extend beyond the first plane and the second plane.

13. The optical fiber assembly of claim 1, further comprising an intermediary spacer sheet disposed between two individual spacer fibers of the array of spacer fibers, wherein a height of the intermediary spacer sheet is less than a diameter of the individual spacer fibers of the array of spacer fibers such that the diameter of the individual spacer fibers define a height of the fiber array spacer.

14. The optical fiber assembly of claim 1, further comprising a support plate, wherein the array of spacer fibers is bonded to a surface of the support plate.

15. An optical assembly comprising:
   a fiber array spacer comprising:
      an array of spacer fibers, wherein individual spacer fibers of the array of spacer fibers are bonded to one another and each individual spacer fiber of the array of spacer fibers comprises a first surface defining a first plane and a second surface defining a second plane parallel to the first plane;
a photonic integrated circuit bonded to the first surface of the fiber array spacer; and
an intermediary spacer sheet disposed between two individual spacer fibers of the array of spacer fibers, wherein a height of the intermediary spacer sheet is less than a diameter of the individual spacer fibers of the array of spacer fibers such that the diameter of the individual spacer fibers define a height of the fiber array spacer.

16. The optical assembly of claim 15, wherein the photonic integrated circuit comprises a plurality of optical waveguides.

17. The optical assembly of claim 15, wherein the photonic integrated circuit is bonded to the fiber array spacer by an adhesive.

18. The optical assembly of claim 15, wherein the photonic integrated circuit is bonded to the fiber array spacer by laser bonding.

19. The optical assembly of claim 15, further comprising an additional fiber array spacer comprising:
an additional array of spacer fibers, wherein:
individual spacer fibers of the additional array of spacer fibers are bonded to one another; and
the additional array of spacer fibers is bonded to the fiber array spacer such that the longitudinal axis of the individual spacer fibers of the additional array of spacer fibers is transverse to the longitudinal axis of the individual spacer fibers of the array of spacer fibers.

20. The optical assembly of claim 15, wherein:
an adhesive disposed between adjacent spacer fibers does not extend beyond the first plane and the second plane.

21. The optical assembly of claim 15, further comprising a support plate, wherein the array of spacer fibers is bonded to a surface of the support plate.

22. A fiber array spacer comprising:
an array of spacer fibers, wherein the array of spacer fibers comprises a first surface defining a first plane and a second surface defining a second plane; and
an adhesive disposed between adjacent spacer fibers that bonds individual spacer fibers to one another, wherein the adhesive does not extend beyond the first plane and the second plane, and wherein the fiber array spacer is configured for an optical component to be bonded to the first surface of the fiber array spacer; and
an additional fiber array spacer comprising:
an additional array of spacer fibers, wherein:
individual spacer fibers of the additional array of spacer fibers are bonded to one another; and
the additional array of spacer fibers is bonded to the fiber array spacer such that the longitudinal axis of the individual spacer fibers of the additional array of spacer fibers is transverse to the longitudinal axis of the individual spacer fibers of the array of spacer fibers.

23. The fiber array spacer of claim 22, wherein individual spacer fibers of the array of spacer fibers are parallel to one another.

24. The fiber array spacer of claim 22, wherein a gap is present between adjacent spacer fibers of the array of spacer fibers.

25. The fiber array spacer of claim 22, further comprising an intermediary spacer sheet disposed between two individual spacer fibers of the array of spacer fibers, wherein a height of the intermediary spacer sheet is less than a diameter of the individual spacer fibers of the array of spacer fibers such that the diameter of the individual spacer fibers define a height of the fiber array spacer.

26. The fiber array spacer of claim 22, further comprising a support plate, wherein the array of spacer fibers is bonded to a surface of the support plate.

27. A method of fabricating an optical assembly, the method comprising:
disposing an optical component onto a fiber array spacer, the fiber array spacer comprising an array of spacer fibers, wherein individual spacer fibers of the array of spacer fibers are bonded to one another and each individual spacer fiber of the array of spacer fibers comprises a first surface defining a first plane and a second surface defining a second plane parallel to the first plane; and
bonding the optical component to the first surface of the fiber array spacer,
wherein:
each optical fiber of the array of optical fibers comprises a glass portion; and
the glass portion of each optical fiber of the array of optical fibers is bonded to the fiber array spacer such that a longitudinal axis of the individual spacer fibers is transverse to a longitudinal axis of individual optical fibers of the array of optical fibers.

28. The method of claim 27, wherein the optical component comprises a fiber ribbon comprising an array of optical fibers.

29. The method of claim 27, wherein the glass portion of each optical fiber of the array of optical fibers is bonded to the fiber array spacer such that the longitudinal axis of individual spacer fibers of the array of spacer fibers is transverse to the longitudinal axis of the individual optical fibers of the array of optical fibers.

30. The method of claim 27, wherein:
the array of optical fibers comprises an interdigitated array of optical fibers comprising signal optical fibers and lateral spacer optical fibers; and
the lateral spacer optical fibers are optical fiber stubs.

31. The method of claim 30, wherein the signal optical fibers and the lateral spacer optical fibers of the interdigitated array of optical fibers are bonded to one another.

32. The method of claim 27, further comprising cutting excess spacer fiber length from at least one of the fiber array spacer and the fiber ribbon.

33. The method of claim 27, wherein the fiber ribbon is bonded to the fiber array spacer by an adhesive.

34. The method of claim 27, wherein the fiber ribbon is bonded to the fiber array spacer by a laser bond.

35. The method of claim 28, wherein the fiber array spacer and the array of optical fibers of the fiber ribbon are fabricated by:
disposing a glass portion of an array of first optical fibers of a first fiber ribbon onto a first support substrate;
disposing a glass portion of an array of second optical fibers of a second fiber ribbon onto the first support substrate such that an interdigitated array of optical fibers comprising alternating first optical fibers and second optical fibers is formed;
disposing a second support substrate on the interdigitated array of optical fibers;
applying opposing lateral forces to the interdigitated array of optical fibers to reduce a gap between adjacent optical fibers of the array of optical fibers;

bonding individual optical fibers of the interdigitated array of optical fibers;

cutting the interdigitated array of optical fibers to separate the first fiber ribbon from the second fiber ribbon, wherein the first fiber ribbon comprises a first interdigitated array of spacer fibers and the second fiber ribbon comprises an interdigitated array of optical fibers comprising alternating second optical fibers and lateral spacer optical fibers defined by cut first optical fibers;

bonding the first interdigitated array of spacer fibers of the first fiber ribbon to the interdigitated array of optical fibers of the second fiber ribbon; and cutting the array of first optical fibers to form the fiber array spacer, wherein the array of optical fibers of the fiber ribbon is defined by the second fiber ribbon.

36. The method of claim 35, wherein:

the fiber array spacer and the interdigitated array of optical fibers of the second fiber ribbon define a first optical fiber assembly;

the method further comprises:
forming a second optical fiber assembly by the method of claim 35; and
bonding the fiber array spacer of the second optical fiber assembly to the interdigitated array of optical fibers of the first optical fiber assembly.

37. The method of claim 36, further comprising:

forming a second optical assembly by the method of claim 35;

disposing the fiber array spacer of the first optical fiber assembly on a horizontal alignment block;

disposing the fiber array spacer of the second optical assembly onto the interdigitated array of optical fibers of the first optical fiber assembly, wherein an adhesive is provided between the first optical fiber assembly and the second optical assembly;

disposing a spacer sheet onto the interdigitated array of optical fibers of the second optical assembly, wherein an adhesive is provided between the second optical assembly and the spacer sheet;

positioning a vertical alignment block against an outermost optical fiber of the first optical fiber assembly and the second optical assembly;

applying a lateral force to the first optical fiber assembly and the second optical assembly to press the outermost optical fiber of the first optical fiber assembly and the second optical assembly to align the interdigitated array of optical fibers of the first optical fiber assembly with the interdigitated array of optical fibers of the second optical assembly in a direction transverse to a longitudinal direction of the interdigitated array of optical fibers of the first optical fiber assembly and the second optical assembly;

curing the adhesive to secure the first optical fiber assembly to the second optical assembly and the second optical assembly to the spacer sheet; and removing the vertical alignment block and the horizontal alignment block from the first optical fiber assembly and the second optical assembly.

38. The method of claim 27, wherein the optical component comprises a photonic integrated circuit.

39. The method of claim 38, wherein the photonic integrated circuit is bonded to the fiber array spacer by an adhesive.

40. The method of claim 38, wherein the photonic integrated circuit is bonded to the fiber array spacer by a laser bond.

41. The method of claim 38, wherein the photonic integrated circuit comprises one or more optical waveguides.

42. The method of claim 27, wherein the fiber array spacer is fabricated by:

disposing a glass portion of an array of first optical fibers onto a first support substrate;

disposing a glass portion of an array of second optical fibers onto the first support substrate such that an interdigitated array of spacer fibers is formed;

disposing a second support substrate on the interdigitated array of spacer fibers;

applying opposing lateral forces to the interdigitated array of spacer fibers to reduce a gap between adjacent spacer fibers of the interdigitated array of spacer fibers;

bonding the individual spacer fibers of the interdigitated array of spacer fibers; and cutting the array of first optical fibers and the array of second optical fibers to form the fiber array spacer.

43. The method of claim 42, wherein:

the individual spacer fibers of the interdigitated array of spacer fibers are bonded by an adhesive; and the adhesive does not extend beyond the first plane and the second plane.

44. The method of claim 42, wherein the individual spacer fibers of the interdigitated array of spacer fibers are bonded by a laser beam.

* * * * *